United States Patent

Shustack

Patent Number: 6,014,488
Date of Patent: Jan. 11, 2000

[54] COATED OPTICAL FIBERS HAVING STRIPPABLE PRIMARY COATINGS AND PROCESSES FOR MAKING AND USING SAME

[76] Inventor: Paul J. Shustack, 8456 Steleta Dr., West Chester, Ohio 45069

[21] Appl. No.: 09/142,102
[22] PCT Filed: Jan. 23, 1998
[86] PCT No.: PCT/US98/01289
§ 371 Date: Sep. 1, 1998
§ 102(e) Date: Sep. 1, 1998
[87] PCT Pub. No.: WO98/33081
PCT Pub. Date: Jul. 30, 1998

Related U.S. Application Data

[60] Provisional application No. 60/035,838, Jan. 24, 1997.
[51] Int. Cl.[7] .................................................. G02B 6/02
[52] U.S. Cl. ............................. 385/128; 65/425; 65/435; 428/378; 385/145
[58] Field of Search ................................. 385/128–130, 385/141, 147, 145, 103, 106, 109; 65/435, 425, 432; 522/180, 181; 428/378; 427/163.2, 165, 302, 377, 385.5, 407.1; 528/307, 376

[56] References Cited

U.S. PATENT DOCUMENTS

| | | |
|---|---|---|
| 4,351,657 | 9/1982 | Kimura et al. . |
| 4,474,830 | 10/1984 | Taylor . |
| 4,552,498 | 11/1985 | Dysarz . |
| 4,590,493 | 5/1986 | Inoue et al. . |
| 4,702,554 | 10/1987 | Takahashi et al. ..................... 385/141 |
| 4,839,400 | 6/1989 | Sato et al. . |
| 4,847,132 | 7/1989 | Takao et al. . |
| 4,880,867 | 11/1989 | Gobel et al. . |
| 4,892,906 | 1/1990 | Pham et al. . |
| 5,000,772 | 3/1991 | Petisce ..................................... 65/425 |
| 5,043,413 | 8/1991 | Tanaka . |
| 5,055,536 | 10/1991 | Dubois . |
| 5,098,852 | 3/1992 | Niki et al. . |
| 5,128,387 | 7/1992 | Shustack . |
| 5,128,391 | 7/1992 | Shustack . |
| 5,146,531 | 9/1992 | Shustack . |
| 5,197,060 | 3/1993 | Yatake . |
| 5,238,744 | 8/1993 | Williams et al. . |
| 5,279,862 | 1/1994 | Corcoran et al. . |
| 5,279,877 | 1/1994 | Uchiyama et al. . |
| 5,330,786 | 7/1994 | Nonaka et al. ...................... 427/163.2 |
| 5,400,317 | 3/1995 | Strasser et al. . |
| 5,427,892 | 6/1995 | Strandjord et al. . |
| 5,478,869 | 12/1995 | Takahashi et al. . |
| 5,508,981 | 4/1996 | Watanabe et al. . |
| 5,510,164 | 4/1996 | Best et al. . |
| 5,518,788 | 5/1996 | Invie . |
| 5,533,001 | 7/1996 | Watanabe et al. . |
| 5,536,529 | 7/1996 | Shustack . |
| 5,538,791 | 7/1996 | Shustack . |
| 5,558,937 | 9/1996 | Woods et al. ............................ 385/145 |
| 5,703,988 | 12/1997 | Oishi et al. ............................. 385/128 |

Primary Examiner—Akm E. Ullah

[57] ABSTRACT

The invention relates to coated optical fibers which are coated with a particular radiation-cured primary coating layer composition. The fibers which are coated comprises a glass core and a glass cladding layer. The core, for example may comprises silica doped with oxides of germanium or phosphorous and the cladding, a pure or doped silicate such as fluorosilicate. Alternatively, the fibers may comprises a polymerclad silica glass core. Examples of such claddings include organosiloxanes such as polydimethylsiloxane or a fluorinated acrylic polymer.

38 Claims, 5 Drawing Sheets

COATED OPTICAL FIBERS HAVING STRIPPABLE PRIMARY COATINGS AND PROCESSES FOR MAKING AND USING SAME

This application claims benefit of U.S. provisional application Ser. No. 60/035,838 Jan. 24, 1997.

BACKGROUND OF THE INVENTION

1. Field of the Invention

The present invention relates to coated optical fibers whose radiation-curable primary coatings are easy to cleanly strip from the optical fiber.

2. Background Discussion

Optical fibers for light transmission as drawn are exceptionally strong and have very few intrinsic defects. However, even a small surface flaw can render such a fiber brittle and easily broken. Thus, such fibers are generally coated by a primary and optionally a secondary coating for protection as disclosed by U.S. Pat. Nos. 5,352,712, 5,527,835 and 5,538,791 to Shustack, these patents being incorporated herein by reference in their entirety. However, when it is desired to splice optical fibers, these coatings are stripped away to expose the optical fibers so they may be spliced. The removal of these coats, as a preparatory step prior to splicing, entails the risk of scratching or otherwise damaging the optical fiber.

A. Optical Fiber Structure

The primary coating is applied directly to the glass fiber and, when cured, forms a soft, rubbery, compliant material which serves as a buffer to cushion and protect the fiber by relieving the stresses created when the fiber is bent, cabled or spooled. Such stress might otherwise induce microbending of the fibers and cause attenuation of the light traveling through them, resulting in inefficient signal transmission. The secondary coating is applied over the primary coating, and functions as a hard, tough protective outer layer, preventing damage to the glass fiber during processing and use. More than one optical fiber can be combined and embedded in a matrix.

Certain characteristics are desirable for the primary coating layer. For example, it must maintain adequate adhesion to the glass fiber during thermal and hydrolytic aging, yet be strippable therefrom for splicing purposes. The tensile modulus of the primary coating must be low to cushion and protect the fiber by readily relieving the stresses on the fiber which can induce microbending and consequent inefficient signal transmission. This cushioning effect must be maintained through the temperature range to which the fiber may be exposed throughout its lifetime. Thus, it is necessary for the primary coating to have a low glass transition temperature (Tg). This low glass transition temperature will ensure that the coating remains in its rubbery state throughout the possible use temperature range.

The primary coating should also have a relatively high refractive index, i.e., greater than that of the cladding material of the fiber to be coated. This high refractive index allows for a refractive index differential between the glass cladding and the primary coating. This differential allows errant light signals to be refracted away from the glass core.

Another requisite quality of the primary (buffer) coating is resistance to moisture or other solvents, e.g., hydrocarbons. Moisture will rapidly degrade the strength of the coating itself as well as the underlying glass fiber under stress.

Another important property of optical fiber coatings is that, when cured, they have a low content of unbound material. While ultraviolet curable materials are often referred to as 100% solids, they may still contain a significant amount of chemically unbound material after the ultraviolet cure. This unbound material can be extractable with solvent or water, or it can be volatile under certain conditions. The presence of an extractable or volatile component in optical fiber products can cause problems which may be detrimental to the fibers. Such potential problems may manifest themselves throughout the lifetime of the optical fiber.

B. Optical Fiber Stripping Can Cause Problems

Although coated optic fibers are very well made, there is often a need to splice together such fibers. This requires stripping the coatings from the fibers and thus exposes the fibers to risk as discussed above. Residue left of the fibers after stripping contributes to the risk. Thus, in the art of optic fibers, there is a significant need to facilitate splicing of optical fibers, especially ribbons of parallel optic fibers, by providing fiber optic coatings which are cleanly strippable to leave little or no residue.

In ribbon stripping, blades of a heated tool cut through the matrix, ink layer, secondary coating and primary coating of the fiber almost to the glass fiber. It is noted that ink is optional or the ink can be avoided by employing a pigmented secondary coating. Then the blades are pulled longitudinally away from the fiber optic ribbon to remove the matrix, secondary coating and primary coating surrounding a portion of the glass of the ribbon. However, it is difficult to remove the matrix and coatings without leaving some residue of the primary coating on the glass. Sometimes the residue can be removed by wiping the glass with an alcohol-laden piece of cloth or paper, e.g., CHEMWIPE towelettes. However, the residue must be removed because the applied splicing coating must adhere directly to the optic fiber. Mechanical wiping of the residue from the glass runs the risk of scratching, and thus weakening, the glass.

This residue is especially significant for fiber optic ribbons provided with full peel matrices. Fiber optic ribbons comprise a plurality of parallel optic fibers held together by a matrix. The full peel matrix is easily removable because it easily peels away from the optic fibers. However, it is generally more difficult to cleanly strip optic fiber ribbons employing a full peel matrix.

The full peel matrix peels away easily because it does not strongly adhere to the (i) secondary coating or (ii) ink which in turn adheres to the secondary coating which in turn adheres to the primary coating. In embodiments employing non-full peel matrices, the coatings and matrices are separated after applying a solvent to the matrix. This residue problem also is present for optical ribbons provided with the non-full peel matrices.

It would be desirable to provide a primary coating which facilitates simultaneous stripping of the matrix, secondary and primary coating while leaving little or no residue on the stripped glass core.

OBJECTS OF THE INVENTION

Figure 1:
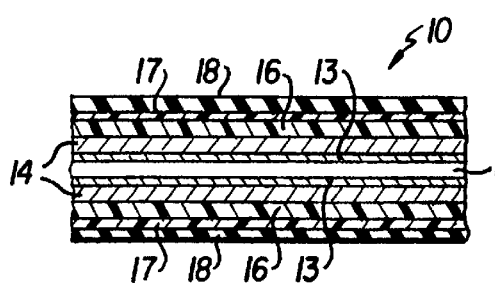
FIG. 1 is a cross-sectional side view of a portion of optical fiber ribbon.

It is an object of the present invention to provide a coated optical fiber which is cleanly strippable.

It is another object of the present invention to provide a cleanly strippable composition for coating an optical fiber.

It is another object of the present invention to provide a process for preparing a coated optical fiber.

It is another object of the present invention to precondition a coated optical fiber for splicing.

SUMMARY OF THE INVENTION

These and other objects of the invention will be apparent in the following descriptions of the invention. The invention includes a coated optical fiber having a primary coating layer formulated of a material that meets three parameters: (1) low intrinsic adhesion to the glass fiber; (2) a high percent elongation to break; and (3) a high tensile strength.

Low intrinsic adhesion of the coating is defined as the adhesion of the coating to glass as measured by a 180° peel back test at 50% relative humidity achieving a peel back force of less than about 50 grams force, preferably less than about 20 grams force, and most preferably less than about 15 grams force. The intrinsic adhesion is predominantly a physical adhesion, rather than chemical coupling, of the coating and substrate. Percent elongation to break of the material is at least 75%, preferably 80%, more preferably at least 90%, and even more preferably at least 100%. Tensile strength is at least about 80 psi, preferably at least about 100 psi, and more preferably at least about 120 psi.

Use of the above-described material results in a primary coating which, when coated on an optical fiber, is strippable from the optical fiber at conventional elevated stripping temperatures with conventional stripping tools, such as the JR4 A tool made by Sumitomo Electric Industries, Inc., of Research Triangle Park, N.C. and the HJS-01 tool made by Alcoa Fujikura Ltd., Spartanburg, S.C., to leave no or substantially no residue of the primary coating on the stripped optical fiber.

Typically, the primary coating is strippable from a portion of the optical fiber at a temperature in at least a portion of the temperature range from about 40° to about 200° C. Stripping occurs by exerting a force to a portion of the primary coating in a direction parallel to the longitudinal axis of the glass fiber which is away from a portion of the primary coating remaining on the optical fiber. A measure of the residue is by visually inspecting the stripped optical fiber at a 2× magnification to determine the number of particles, or other forms, of residue on the stripped fiber surface. Preferably, the residue is removed directly by the stripping tool. However, it may be acceptable if the vast majority of the primary coating is removed by the stripping tool and at most a minor portion remains. By minor portion is meant less than 20 particles per 30 millimeters of stripped fiber are visible at 2× magnification and these particles are removable by a single wipe of an alcohol, e.g., ethanol or isopropanol, laden swatch of cloth or paper, e.g., CHEMWIPE towelettes. Twenty or more particles removable by one wipe is a 3 on the cleanliness rating scale. It is detrimental to require more than one wipe to remove residue after use of the stripping tool because the mechanical wiping can damage the optical fiber.

In its process respects the invention includes a process for preparing a coated optical fiber comprising the steps of applying to an optical fiber a primary coating composition layer comprising a mixture of the following ingredients:

(i) from about 10 to about 80 percent by weight of one or more acrylate- or methacrylate-terminated urethane oligomers;

(ii) from about 10 to about 75 percent by weight of one or more monomer diluents;

(iii) from about 0 to about 3.0 percent by weight of an organofunctional silane adhesion promoter which binds in with the primary coating composition during cure;

(iv) from about 0 to about 10.0 percent by weight of a photoinitiator, all of said percentages being percentages by weight based on the weight of all ingredients.

Then the coating is radiation (e.g. light or electron-beam)-cured in situ. The cured primary coating is strippable from a portion of the optical fiber at a temperature in at least a portion of the temperature range from about 40° to about 200° C. by exerting a force to a portion of the primary coating in a direction parallel to the longitudinal axis of the glass fiber. The exertion of force followed by an optional one wipe with an alcohol laded piece of cloth or paper of the stripped portion of optical fiber, results in the stripped portion of optical fiber having substantially no residue of the primary coating as observable by a 2 power magnification.

The invention also provides a curable composition comprising a material, which upon coating on an optical fiber, is strippable from a portion of the optical fiber at a temperature in at least a portion of the temperature range from about 40° to about 200° C. by exerting a force to a portion of the primary coating about the portion of optical fiber in a direction parallel to the longitudinal axis of the glass fiber which is away from a portion of the primary coating remaining on the optical fiber, such that the exertion of force followed by an optional one wipe with an alcohol laden piece of cloth or paper of the stripped portion of optical fiber, results in the stripped portion of optical fiber having substantially no residue of the primary coating as observable by a 2 power magnification. Preferably, the coating prior to curing has a freeze point of at most about 60° C. Moreover, the freeze point is at most about 25° C. Typically, the primary coating is made of a material which is removable from a glass substrate by a peel force of less than 50 grams of force, as measured by a 180° peel back test at 50% relative humidity and room temperature, an elongation to break of at least about 80% as measured by ASTM D-882, and a tensile strength of at least about 80 psi as measured by ASTM D-882.

The above described and other objects of the present invention will be apparent from the following description.

DESCRIPTION OF THE PREFERRED EMBODIMENTS

The invention relates to coated optical fibers which are coated with a particular radiation-cured primary coating layer composition. The fibers which are coated may, for example, comprise a glass core and a glass cladding layer. The core, for example, may comprise silica doped with oxides of germanium or phosphorus and the cladding, a pure or doped silicate such as fluorosilicate. Alternately, the fibers may comprise a polymerclad silica glass core. Examples of such polymer claddings include organosiloxanes such as polydimethylsiloxane or a fluorinated acrylic polymer.

Figure 1A:
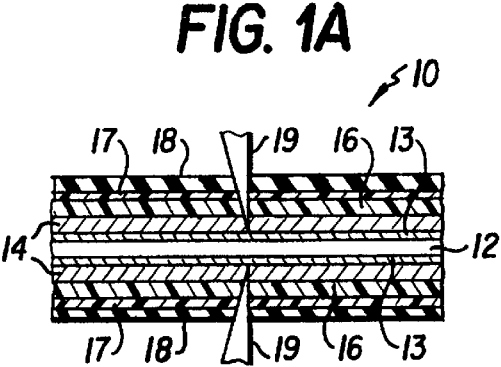
FIG. 1A is a cross-sectional view of a coated optical fiber of the optical fiber ribbon of FIG. 1 being cut for stripping.

As shown in FIG. 1, a typically coated fiber 10 has a glass core 12, cladding 13, a primary coating 14, a secondary coating 16, ink 17 and a matrix 18 for holding a plurality of coated optical fibers together to form an optical ribbon. FIG. 1A shows the coated optical fiber of FIG. 1 being cut prior to stripping by blades 19.

Generally the primary coating 14 and secondary coating 16 are each approximately 1 mil thick. Ink, if any, may be present as a layer 17 which is 3–5 microns thick and located between the matrix 18 and the outer surface of the secondary coating 16.

The primary coating includes any primary coating, which meets the adhesion, elongation and tensile strength criteria defined above. The primary coating layer should also have, among other properties, the following properties: moisture resistance; ease of coating and stripping; low volatiles content; low modulus over the life of the fiber (i.e., less than about 500 psi at 25° C., so as to prevent signal attenuation from microbending); low glass transition temperature; and long shelf life.

The secondary coating should form a hard protective layer; have a relatively high modulus and glass transition temperature; and also be moisture resistant. Both coatings should be transparent; nonmalodorous; fast curing; and remain adherent, even upon aging in high heat and humidity environments.

A. The Primary Coating

The primary coating is made of cured material such that the primary coating is strippable from a portion of the optical fiber at a temperature in at least a portion of the temperature range from about 40° to about 200° C. Stripping occurs by exerting a force to a portion of the primary coating, about the portion of optical fiber. The force is exerted in a direction parallel to the longitudinal axis of the glass fiber, which is away from the primary coating remaining on the optical fiber. The exertion of force followed by an optional one wipe with an alcohol laden piece of cloth or paper of the stripped portion of optical fiber, results in the stripped portion of optical fiber having substantially no residue of the primary coating as observable by a 2 power magnification.

In particular, the cured material of the primary coating is made of a material which is removable from a glass substrate by a peel force of less than 50 grams of force, as measured by a 180° peel back test at 50% relative humidity and room temperature, an elongation to break of at least about 75%, preferably about 80% as measured by ASTM D882, and a tensile strength of at least about 80 psi as measured by ASTM D882. Preferably, the peel force is less than 20 grams, and more preferably less than 15 grams of force. Most preferably, the peel force ranges from about 5 to about 15 grams of force. More preferably, the percent elongation to break is at least about 90%, and even more preferably at least about 100%. Typically the percent elongation to break ranges from about 100 to about 150%. Preferably, the tensile strength is at least about 100 psi, and more preferably at least about 120 psi. Typically, the tensile strength ranges from about 100 to about 200 psi.

One such composition possessing the desired properties comprise the following components:
(1) (meth)acrylate-terminated urethane oligomer;
(2) monomer diluent;
(3) optional adhesion promoter;
(4) optional photoinitiator; and
(5) optional stabilizer
make up the primary coating layer composition which, when cured, forms the primary coating layer of the invention.

(1) The (Meth)acrylate-Terminated Urethane Oligomer

In one embodiment according to the invention, acrylate- or methacrylate-terminated oligomers are capable of homopolymerization to form the primary coating layer of the invention. More specifically, the acrylate- or methacrylate-terminated ingredient is a wholly aliphatic urethane acrylate or methacrylate oligomer.

This oligomer component contributes significantly to achieving a cured primary coating material which meets the adhesion, tensile strength and percent elongation to break specified above. This component is also chosen to confer good thermal and hydrolytic properties on the cured coating, and to be somewhat non-yellowing.

The urethane acrylate or methacrylate oligomer comprises from about 10 percent to about 80 percent by weight of the uncured primary coating material (composition), based on the total weight of the composition. Preferably, this oligomer component comprises from about 15 percent to about 70 percent, and more preferably about 20 percent to about 60 percent by weight of the composition based upon the total weight of all ingredients. If less than about 10 percent by weight of this component is used, flexibility, elongation to break and overall toughness will suffer. If more than about 80 percent by weight is used, the viscosity of the composition may be undesirably high and thus make application of the liquid composition difficult unless special provisions, such as heating the applicator die, are made.

The acrylate- or methacrylate-terminated urethane oligomer utilized in the present invention is the reaction product of (i) an aliphatic polyol; (ii) an aliphatic polyisocyanate; and (iii) an endcapping monomer capable of supplying a reactive terminus, either acrylate or methacrylate.

The polyol (i) may be an aliphatic polyol which does not adversely affect the properties of the composition when cured. Examples include polyether polyols; hydrocarbon polyols; polycarbonate polyols; polyisocyanate polyols; and mixtures thereof. Polyols which should be limited or preferably excluded include polyester or epoxy backbones. However, polyether polyol backbones are preferred, because, in general, they have good solvent resistance and are relatively inexpensive. The polyether polyol is typically based on a straight chain, branched or cyclic alkylene oxide wherein the alkyl group contains about one to about twelve carbon atoms. Polyether diols and triols are preferred because they confer good solvent resistance and are relatively inexpensive. Such polyether polyols include but are not limited to polytetramethylene polyol, polymethylene oxide, polyethylene oxide, polypropylene oxide, polybutylene oxide, isomers thereof, and mixtures thereof. A particularly preferred polyether polyol comprises at least some units of polytetramethylene oxide and/or polypropylene oxide.

The oligomeric component may contain very small amounts of urethane acrylates based on polyesters, but preferably contains only the above kinds of oligomers, for optimal long term stability.

A representative polyether polyol is based on a straight chain, cyclic, or branched alkylene oxide wherein the alkyl group contains from one to about twelve carbon atoms. The polyether polyol may be prepared by any method known in the art. Preferably, it has a number average molecular weight (Mn), as determined in this case by vapor pressure osmometry (VPO), per ASTM D-3592, sufficient to give the entire oligomer based on it a molecular weight of not more than about 6,000 daltons, preferably not more than about 5,000 daltons, and more preferably not more than about 4,000 daltons. Such polyether polyols include but are not limited to polytetramethylene polyol, polymethylene oxide, polyethylene oxide, polypropylene oxide, polybutylene oxide, isomers thereof, and mixtures thereof.

Representative hydrocarbon polyols which may be used include but are not limited to those based on a linear or branched hydrocarbon polymer of from 600 to 4,000 molecular weight such as fully or partially hydrogenated 1,2-polybutadiene; 1,2-polybutadiene hydrogenated to an iodine number of from 9 to 21; and fully or partially hydrogenated polyisobutylene. Unsaturated hydrocarbon polyols are not desirable because the oligomers made from them, when cured, are susceptible to oxidation.

Representative polycarbonate polyols include but are not limited to the reaction products of dialkyl carbonate with an alkylene diol, optionally copolymerized with alkylene ether diols.

The polyisocyanate component (ii) is non-aromatic. Oligomers based on aromatic polyisocyanates effect yellowing in the cured coating. Non-aromatic polyisocyanates of from 4 to 20 carbon atoms may be employed. Suitable saturated aliphatic polyisocyanates include but are not limited to isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; omega, omega'-dipropylether diisocyanate; 1,4-cyclohexyl diisocyanate; 1,3-cyclohexyl diisocyanate; trimethylhexamethylene diisocyanate; 1,3-bis(isocyanatomethyl) cyclohexane; 1,4-diisocyanato-butane; biuret of hexamethylene diisocyanate; norbornane diisocyanatomethyl 2,5(6)-bis(isocyanatomethyl)bicyclo (2,2,1) heptane and mixtures thereof.

Isophorone diisocyanate is a preferred aliphatic polyisocyanate. Suitable (though less preferred) aromatic polyisocyanates include toluene diisocyanate; diphenylmethylene diisocyanate; tetramethyl xylylene diisocyanate; 1,3-bis (isocyanatomethyl) benzene; p,m-phenylene diisocyanate; 4,4'-diphenylmethane diisocyanate; dianisidine diisocyanate (i.e., 4,4'-diisocyanato-3,3'-dimethoxy-1,1'-biphenyl diisocyanate); tolidine diisocyanate (i.e., 4,4'-diisocyanato-3,3'-dimethy-1,1'-biphenyl diisocyanate); and mixtures thereof. Of the aromatic polyisocyanates, toluene diisocyanate is preferred. Very small amounts of aromatic polyisocyanates may be used. However, long term stability on aging may suffer somewhat.

The reaction rate between the hydroxyl-terminated polyol and the diisocyanate may be increased by use of a catalyst in the amount of 100 to 200 ppm. Suitable catalysts include but are not limited to dibutyl tin dilaurate, dibutyl tin oxide, dibutyl tin di-2-hexoate, stannous oleate, stannous octoate, lead octoate, ferrous acetoacetate, and amines such as triethylamine, diethylmethylamine, triethylenediamine, dimethylethylamine, morpholine, N-ethyl morpholine, piperazine, N,N-dimethyl benzylamine, N,N-dimethyl laurylamine, and mixtures thereof.

The endcapping monomer (iii) may be one which is capable of providing at least one reactive terminus and which preferably provides acrylate or methacrylate termini. Suitable hydroxyl-terminated compounds which may be used as the endcapping monomers include, but are not limited to, hydroxyalkyl acrylates or methacrylates. Systems analogous to the acrylate- or methacrylate-based compositions, but bearing any reactive end groups, are equally suitable. Various other exemplary end groups capable of reacting upon irradiation or other means, either by free radical initiation or cationic cure, to provide excellent performance coatings include, but are by no means limited to, free radical systems such as thiolene systems (based on the reaction of multifunctional thiols and unsaturated polyenes, such as vinyl ethers; vinyl sulfides; allylic ethers and bicyclicenes); amine-ene systems (based on the reaction of multifunctional amines and unsaturated polyenes); acetylenic systems; systems wherein the reactive portion of the component is internal rather than terminal; other vinylic (e.g., styrenic) systems; acrylamide systems; allylic systems; itaconate systems and crotonate systems; and cationic cure systems such as onium salt-induced vinyl ether systems and epoxy-terminated systems which react by ring-opening; and any others based on compounds possessing reactive termini. In fact, virtually any end groups which cure by irradiation or other means but do not adversely effect the desirable properties (i.e., the oxidative, thermal and hydrolytic stability and the moisture resistance) of the cured composition are envisioned. The analogous systems are further disclosed by U.S. Pat. No. 5,352,712 to Shustack, incorporated herein by reference in its entirety.

Typical acrylates and methacrylates include hydroxyethyl acrylate, hydroxyethyl methacrylate, hydroxypropyl acrylate, hydroxypropyl methacrylate, hydroxybutyl acrylate, hydroxybutyl methacrylate, and so forth.

A particularly preferred endcapping monomer is hydroxyethyl acrylate or hydroxyethyl methacrylate.

The molar ratio of the polyol, diisocyanate and endcapping monomer is preferably approximately 1:2:2.

Commercially available oligomers are suitable for the (meth) acrylated oligomer component of this invention so long as the cured primary coating material made therefrom meets the required criteria of 180° peel back force, percent elongation to break, and tensile strength. By routine testing based on teachings disclosed in this specification, one skilled in the art would test the cured material for the required criteria. Potential resins include but are not limited to the following resins.

1. Echo Resins ALU-350 series resins, i.e., 350, 351, 352, 353 and 354, from Echo Resins and Laboratory, Versailles, Mo., are polytetramethylene polyol-based acrylated aliphatic urethane oligomers of increasing molecular weight and viscosity and decreasing modulus with increasing number in the series. Certain physical properties for this series of resins are summarized TABLE 1:

TABLE 1

|  | ALU-350 | ALU-351 | ALU-352 | ALU-353 | ALU-354 |
|---|---|---|---|---|---|
| Density |  |  |  |  |  |
| @ 20° C. (g/cm$^3$) | 1.052 | 1.048 | 1.027 | 1.019 | 1.019 |
| (lbs/gal) | 8.76 | 8.73 | 8.55 | 8.49 | 8.49 |
| Refractive Index | 1.496 | 1.492 | 1.478 | 1.468 | 1.460 |
| Viscosity |  |  |  |  |  |
| @ 78° F. (cps) | 320,000 | 120,000 | wax | wax | wax |
| @ 140° F. (cps) | 7,300 | 5,400 | 8,900 | 21,750 | 30,000–40,000 |
| Color, Gardner | <1 | <1 | <1 | <1 | <2 |
| Functionality | 2 | 2 | 2 | 2 | 2 |
| Percent Shrinkage, Cured | 3.6 | 2.8 | 1.7 | 1.3 | 1.1 |
| Number Average Molecular Weight (VPO) | 1,390 | 1,410 | 2,300 | 3,550 | 4,880 |

For these oligomers, number average molecular weight was determined by vapor pressure osmometry (VPO) using a Knauer VPO, calibrated with benzil, tetracosane and polystyrene standards, using toluene as solvent, for 3 minutes at 40° C., zero balance of 9 and range of 8, using a Universal probe.

In general, the lower molecular weight members of the series are preferred because they are less waxy and easier to work with, and because the compositions including them swell less when contacted with solvents which they may encounter.

The methacrylate equivalents of these oligomers are equally suitable.

2. PURELAST aliphatic urethane acrylate oligomers based on polyether backbones, available from Polymer Systems Corporation, Orlando, Fla. Suitable PURELAST oligomers include 566, 566A, 569, 569A, 569V, 586, 586A, 586V, 590, 590A, 595 and 595A, preferably, 590 and 590A. This series of oligomers increases in modulus with increasing number in the series. These oligomers are either difunctional (no suffix) or monofunctional (suffix). All of these oligomers are sold neat.

Methacrylate analogs of these oligomers are suitable as well.

3. SARTOMER CN 980 and 981, are both polyether-backbone aliphatic urethane acrylates, also from Sartomer Company, Exton, Pa.

4. BR-372, BR-543, BR-571, BR-582, BR-5824, BR-5825, STC3-149, especially wherein 66–100% of the oligomer component is BR-582, are polyether-backbone aliphatic urethane acrylates, from Bomar Specialties, Winsted, Conn.

5. RX 01203, RX 01099, RX 01336, RX 01071, RX 01218, IRR 245, EBECRYL 8800, EBECRYL 270, and EBECRYL 4826 oligomers, are from UCB Chemicals Corporation, Smyrna, Ga., all aliphatic urethane diacrylate oligomers based on polyethers.

EBECRYL 8800 oligomer is diluted 10% with ethoxyethoxyethyl acrylate; has a viscosity at 65° C. of 8,000–18,000 cps and a Gardner Color Index of 2 max. Its density is 8.75 pounds per gallon. Its theoretical molecular weight is 1,700. When cured it has a tensile strength of 3,150 psi; a tensile elongation of 83%, and a glass transition temperature of 48° C.

EBECRYL 270 oligomer, previously sold as EBECRYL 4826 oligomer, contains no diluent monomer; has a viscosity of 2,500–3,500 cps at 60° C. and a Gardner Color Index of 2 max. Its density is 8.91 pounds per gallon. Its theoretical functionality is 2 and its theoretical molecular weight is 1,500. When cured it has a tensile strength of 1,200 psi, a tensile elongation of 87% and a glass transition temperature of –27° C.

Methacrylate equivalents of these oligomers may also be used.

6. UVITHANE ZL-1178 oligomer from Morton Thiokol, Inc., Morton Chemical Division, Princeton, N.J., polyether based aliphatic urethane acrylate. This oligomer has a viscosity of 55–75 poises at 120° F. and 700–800 poises at 78° F. and, when cured neat, has a tensile strength of 325 psi and an ultimate elongation of 45%.

The methacrylate analog of this monomer may be used as well.

7. EBECRYL 4842, which is a silicone-modified polyether-based aliphatic urethane acrylate, sold neat, and EBECRYL 19-6264, which is not silicone-modified, but which is a polyether-based aliphatic urethane acrylate and which contains about 15% by weight of 1,6-hexanediol diacrylate as a reactive solvent, are from UCB Chemicals Corporation, Smyma, Ga.

8. Hydrocarbon polyol-based aliphatic urethane acrylate oligomers such as are disclosed in U.S. Pat. No. 5,146,531, to Shustack. The content of that patent is expressly incorporated herein by reference. These oligomers are based on a linear or branched hydrocarbon polymer of from 600 to 4,000 molecular weight such as fully or partially hydrogenated 1,2-polybutadiene; 1,2-polybutadiene hydrogenated to an iodine number of from 9 to 21; and fully or partially hydrogenated polyisobutylene.

9. Polyether polyol-based oligomer of U.S. Pat. No. 5,527,835 to Shustack is also acceptable for use in making primary coating and is incorporated herein by reference in its entirety.

10. Furthermore, any aliphatic urethane acrylate or methacrylate oligomer of the type exemplified above is believed to be suitable so long as the desirable properties of the claimed composition are not adversely effected.

The cured primary coating of this invention has a water absorption value of less than about 5% by weight, and preferably less than about 3%. Furthermore, the cured material should swell less than 40% in length, and, in some embodiments, less than about 30% in length, when soaked in gasoline for about 4 hours at room temperature.

(2) The Monomer Diluent

The monomer diluent component which is reacted with the above-described oligomer in preparing the primary coating layer of the invention is selected to be one that is compatible with the oligomers above. It should be reactive with the above-described oligomers, and preferably has one or more acrylate or methacrylate moieties per monomer. The monomer diluent may be capable of lowering the Tg (glass transition temperature) of the cured composition including it, and of lowering the viscosity of the uncured (liquid) composition to within the range of about 1,000 to about 10,000 cps (centipoises) at 25° C., preferably about 4,000 to about 8,000 cps, as measured by a Brookfield viscometer, Model LVT, spindle speed #34, at 25° C. If a viscosity higher than about 10,000 cps results, the liquid (uncured) composition including it may still be useful if certain processing modifications are effected (e.g., heating the dies through which the liquid coating composition is applied).

The monomer diluent comprises about 10 to about 75 percent, preferably about 15 to about 70 percent, and more preferably about 20 to about 65 percent by weight of the uncured (liquid) composition, based on the total weight of the composition (all ingredients). If less than about 10 percent of the monomer is present, viscosity may, again, be too high. Conversely, if more than 75 percent is present, viscosity would be too low.

Suitable examples of monomer diluents include, but are not limited to, aromatic-containing monomers such as phenoxyalkyl acrylates or methacrylates (e.g., phenoxyethyl (meth)acrylate); phenoxyalkyl alkoxylate acrylates or methacrylates (e.g., phenoxyethyl ethoxylate(meth)acrylate or phenoxyethyl propoxylate(meth)acrylate); para-cumylphenol ethoxylated (meth)acrylate; 3-acryloyloxypropyl-2-N-phenylcarbamate; or one of any other such monomer diluents known to adjust the refractive index of a composition including it. Combinations including one or more of these are suitable as well. Such monomer diluents belonging to the later category are disclosed and described in U.S. Pat. No. 5,146,531 to Shustack herein incorporated by reference and may, for example, contain (1) an aromatic moiety; (2) a moiety providing a reactive (e.g., acrylic or methacrylic) group; and (3) a hydrocarbon moiety.

Samples of aromatic monomer diluents additionally containing hydrocarbon character and a vinyl group include but are not limited to polyalkylene glycol nonylphenylether acrylates such as polyethylene glycol nonylphenylether acrylate or polypropylene glycol nonylphenylether acrylate; polyalkylene glycol nonylphenylether methacrylates such as polyethylene glycol nonylphenylether methacrylate or polypropylene glycol nonylphenylether methacrylate; and mixtures of these.

Such monomers are, for example, available from Toagasei Chemical Industry Company, Ltd., Tokyo, Japan under the trade names ARONIX M110, M111, M113, M114, and M117, and from Henkel Corporation, Ambler, Pa., under the trade name PHOTOMER 4003. Especially M114, i.e., nonyl phenol 8 (EO) acrylate is preferred.

Other suitable monomer diluents additionally include hydrocarbon alkyl acrylates or methacrylates which are either straight chain or branched, and may contain 8 to 18 carbon atoms in the alkyl moiety such as hexyl acrylate; hexyl methacrylate; ethylhexyl acrylate; ethylhexyl methacrylate; isooctyl acrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; myristyl acrylate; myristyl methacrylate; palmitic acrylate; palmitic methacrylate; stearyl acrylate; stearyl methacrylate; cetyl acrylate; cetyl methacrylate; C14–C15 hydrocarbon diol diacrylates; C14–C15 hydrocarbon diol dimethacrylates; and mixtures of the above. Of these, cetyl, lauryl and stearyl acrylates or methacrylates are most desired.

Also suitable are cyclic monomers such as isobornyl acrylate; isobornyl methacrylate; dicyclopentenyl acrylate; dicyclopentenyl methacrylate; dicyclopentenyl ethoxylate acrylate; dicyclopentenyl ethoxylate methacrylate; tetrahydrofurfuryl acrylate; tetrahydrofurfuryl methacrylate; and mixtures thereof. Also suitable is TONE M-100 monomer, a caprolactone acrylate available from Union Carbide Corp., Danbury, Conn., GENORAD 1122 monomer available from Hans Rahn, Zurich, Switzerland, which is 2-propenoic acid, 2-(((butyl)amino)carbonyloxy)ethylester, and N-vinyl caprolactam.

Monomers which are unsuitable include hydrophilic ones such as n-vinyl pyrrolidone and n-vinyl formamide. N-vinyl pyrrolidone, has in the past been widely used in optical fiber coating applications. However; it is particularly undesirable because it is hydrophilic and, on long term water soaking, confers very poor water resistance. Moreover, it has been found recently to be carcinogenic. Thus, the composition should be substantially free of these monomers.

Preferred monomers include the refractive-index modifying type monomers as disclosed herein, alone or in combination with an alkyl (meth)acrylate such as lauryl acrylate.

(3) Adhesion Promoter

Also included in the composition which makes up the primary coating layer may be, in some embodiments, an adhesion promoter. Adhesion becomes a particularly pertinent problem in high humidity and high temperature environments, where delamination is more of a risk. For uses protected from such environments, an adhesion promoter may be required.

It is known in the art to use either acid-functional materials or organofunctional silanes to promote adhesion of resins to glass. While acid-functional materials are operative herein, organofunctional silanes are preferred. Acid-functional materials are less preferred, however, because of their possible corrosivity towards the materials, and their tendency to lose their adhesion properties on exposure to moisture. (In general, acid-functional materials should be avoided in the compositions of the invention.) Silanes tend to be much more suitable in terms of these factors and, therefore, are the adhesion promoters of choice. Additionally, it is useful to have an adhesion promoter having a functionality which binds in with the system during cure, again to minimize the quantities of unbound volatiles. Various suitable organofunctional silanes include but are not limited to acrylate-functional silanes; amino-functional silanes; mercapto-functional silanes; methacrylate-functional silanes; acrylamido-functional silanes; allyl-functional silanes; and vinyl-functional silanes. The adhesion promoters preferably are methoxy- or ethoxy-substituted as well. Preferred organofunctional silanes include but are not limited to mercaptoalkyl trialkoxy silane, (meth)acryloxyalkyl trialkoxy silane, aminoalkyl trialkoxy silane, mixtures thereof, and the like. Methacrylated silanes are desirable, because they bind well with the cured system. However, they tend to slow the cure speed of the system. The mercapto-functional adhesion promoters also chemically bind in during cure, but do not appreciably slow down the cure speed of the system.

Some preferred organofunctional silanes that enhance adhesion in humid conditions include 3-acryloxypropyltrimethoxy silane, vinyl-tris(2-methoxyethoxysilane), 3-methacryloxypropyltrimethoxy silane, 3-aminopropyltriethoxy silane, 3-mercaptopropyl trimethoxy silane and 3-mercaptopropyl triethoxy silane, and mixtures thereof. A particularly preferred adhesion promoter is 3-acryloxypropyltrimethoxy silane.

The silane component should be incorporated into the composition which is to be cured to form the primary coating layer in a small but effective amount to enhance the adhesion of the composition to the surface of the substrate. The silane component comprises from about 0.1 percent to about 3.0 percent by weight of the composition, based on total weight of all ingredients. Preferably, the silane comprises from about 0.2 percent to about 2.0 percent, and more preferably from about 0.3 percent to about 1.0 percent, based on the total weight of the composition.

(4) The Photoinitiator

Another component of the composition which makes up the primary coating layer may be a photoinitiator. The necessity for this component depends on the envisioned mode of cure of the composition. If the composition is to be ultraviolet cured, a photoinitiator is needed. If it is to be cured by an electron beam, the material may comprise substantially no photoinitiator.

In the ultraviolet cure embodiment, the photoinitiator, when used in a small but effective amount to promote radiation cure, must provide reasonable cure speed without causing premature gelation of the composition. Further, it must not interfere with the optical clarity of the cured coating. Still further, the photoinitiator must itself be thermally stable, non-yellowing, and efficient.

Suitable photoinitiators include, but are not limited to, the following: hydroxycyclohexylphenyl ketone; hydroxymethyl-phenylpropanone; dimethoxyphenylacetophenone; 2-methyl-1-(4-methyl (thio)phenyl)-2-morpholinopropanone-1; 1-(4-isopropylphenyl)-2-hydroxy-2-methylpropan-1-one; 1(4-dodecylphenyl)-2-hydroxy-2-methylpropan-1-one; 4-(2-hydroxyethoxy) phenyl-(2-hydroxy-2-propyl)ketone; diethoxyacetophenone; 2,2-di-sec-butoxyacetophenone; diethoxy-phenyl acetophenone; and mixtures of these.

A preferred class of photoinitiators are the triacylphosphine oxides, such as trimethylbenzoyldiphenyl-phosphine oxide (available from BASF Corp., Chemicals Division, Charlotte, N.C. as LUCIRIN TPO), trimethylbenzoylethoxyphenylphosphine oxide (available from BASF as LUCIRIN 8893); bis-(2,6-dimethoxybenzoyl)-2,4,4-trimethylpentyl phosphine oxide (available from Ciba-Geigy Corp., Ardseley, N.Y.); bis-(2,6-dimethoxybenzoyl)-2,4,4-trimethyl pentyl phosphine oxide (sold as a component of CGI 1700 or CGI 1800 available from Ciba-Geigy Corp., Ardseley, N.Y.); bis-(2,4,6-trimethylbenzoyl) phenylphosphine oxide; and mixtures thereof. The BASF phosphine oxides marketed as LUCIRIN TPO and LUCIRIN 8893, alone or, particularly, in combination, are preferred.

The photoinitiator, when used, preferably comprises from about 0.5 percent to about 10.00 percent by weight of the uncured composition, based upon the weight of the total composition. Preferably, the amount of photoinitiator is from about 1.0 percent to about 6.0 percent. The photoinitiator should be used at a level such that a cure speed, as measured in a dose versus modulus curve, of less than 0.7 J/cm$^2$, and preferably less than 0.5 J/cm$^2$, is obtained.

(5) Stabilizer

To improve shelf life (storage stability) of the uncured primary coating composition, as well as to increase thermal and oxidative stability of the cured primary coating layer, one or more stabilizers may be included in the composition. Examples of suitable stabilizers include tertiary amines such as diethylethanolamine and trihexylamine, hindered amines, organic phosphates, hindered phenols, mixture thereof, and the like. Some particular examples of antioxidants which can be used include octadecyl-3-(3',5'-di-tert-butyl-4'-hydroxyphenyl) propionate, thiodiethylene bis (3,5-di-tert-butyl-4-hydroxy) hydrocinnamate, and tetrakis (methylene (3,5-di-tert-butyl-4-hydroxyhydrocinnamate)) methane. Additionally, certain silanes in small quantities, e.g., as low as 0.0001 percent to 0.1 percent by weight, may be used as stabilizers. An example of suitable such silane is 3-aminopropyl trimethoxy silane.

When a stabilizer is used, it may be incorporated in an amount from about 0.0001 percent to about 3.0 percent, based on the weight of the composition. Preferably, it is included in the range from about 0.25 percent to about 2.0 percent by weight, and more preferably in the range from about 0.5 percent to about 1.5 percent by weight, based on the total weight of all of the ingredients. Desirable properties of a stabilizer include (1) non-migration (probably enhanced by low polarity) and (2) basicity (to allow it to help in neutralizing residual acid which might prematurely initiate polymerization). Preferred stabilizers are thiodiethylene bis (3,5-di-tert-butyl-4-hydroxy) hydrocinnamate and 3-aminopropyl trimethoxysilane.

B. The Secondary Coating

The composition which makes up the primary coating layer of this invention is typically top coated with a secondary coating as known in the art. However, in some cases, if tailored to be suitable therefor, the primary coating may be a monocoat wherein only this primary coating is required. A suitable secondary optical fiber coating, when used, optimally possesses good thermal, oxidative and hydrolytic stability; hardness; high modulus; high glass transition temperature; and high refractive index.

Suitable secondary coatings, applied atop the primary coatings of the invention, are those which are known in the art, including but not limited to those disclosed in U.S. Pat. No. 5,352,712 to Shustack (expressly incorporated herein by reference).

Such secondary coating may, for example, comprise the reaction product of from about 10 percent to about 90 percent by weight of an aliphatic urethane oligomer based on a polyester and/or polyether and containing a reactive terminus; from about 20 percent to about 60 percent by weight of a hydrocarbonaceous viscosity-adjusting component capable of reacting with the reactive terminus of the oligomer; and optionally, from about 0.05 percent to about 10.0 percent by weight of a photoinitiator.

One preferred secondary coating may comprise the reaction product of from about 40 percent to about 80 percent by weight of a mixture of aliphatic urethane acrylate oligomers based on polyether backbones; from about 25 percent to about 50 percent by weight of a mixture of isobornyl acrylate and hexanediol diacrylate; and from about 2.0 percent to about 7.0 percent by weight of hydroxycyclohexylphenyl ketone photoinitiator.

C. Preparation of a Coated Optical Fiber

The invention also relates to a process for preparing a cleanly strippable coated optical fiber.

Preferably, the process comprises applying to an optical glass fiber a primary coating composition layer comprising the following ingredients:

(A) from about 10 percent to about 90 percent by weight of a reactively terminated urethane oligomer which is the reaction product of (i) at least one polyol selected from the group consisting of polyether polyols, hydrocarbon polyols, polycarbonate poyols, and polyisocyanate polyols; (ii) a wholly aliphatic polyisocyanate; and (iii) an endcapping monomer supplying a reactive terminus;

(B) from about 5 percent to about 80 percent by weight of a monomer diluent which is terminated with at least one end group capable of reacting with the reactive terminus of (A);

(C) from about 0 to about 10 percent by weight of a photoinitiator; and (D) from about 0 to about 3 percent by weight of an organofunctional silane adhesion promoter which binds in with the primary coating composition during cure;

wherein all of the stated percentages are percentages by weight based on the total weight of (A), (B), (C) and (D). Typically, the refractive index of the cured coating composition is 1.48 or higher.

Preferably, the process comprises applying to an optical glass fiber a primary coating composition layer comprising the following ingredients:

(1) from about 10 to about 80 percent by weight of one or more acrylate- or methacrylate-terminated urethane oligomers;

(2) from about 10 to about 75 percent by weight of one or more monomer diluents;

(3) from about 0 to about 10 percent by weight of a photoinitiator; and (4) from about 0 to about 3 percent by weight of an organofunctional silane adhesion promoter which binds in with the primary coating composition during cure.

All of these percentages are percentages by weight based on the weight of ingredients (1), (2), (3) and (4). Moreover, the coating ingredients are selected to meet the low adhesion to glass, as measured by a 180° force test, high tensile strength, and high elongation to break as described above.

Preferably, the primary coating material, prior to curing, has a freeze point, i.e., temperature of initiation of crystallization, of at most about 60° C., preferably at most about 25° C. The frozen particles formed at the freeze point may be visible with magnification or visible without magnification. Typically, the freeze point is in the range from about 0° to about 60° C., preferably from about 0° C. to about 25° C. To achieve these freeze points, preferably the combination of oligomers and monomers is liquid at 5 to 25° C., or at least a liquid at room temperature. Employing liquids facilitates mixing these ingredients. This liquid may be achieved by starting with a liquid oligomer. Generally the monomers are liquid. However, such liquid mixtures may also be made from solid oligomer which liquifies upon mixing with monomer.

If the material freezes, it is not homogeneous. However, it may be returned to homogeneity by heating.

After mixing the composition and coating it onto an optical fiber, the coating undergoes radiation-curing in situ. In one embodiment, the process comprises applying only the primary coating composition of the invention to the optical fiber and radiation-curing the coating in situ. In an alternative embodiment, a secondary coating composition may be applied atop the primary coating composition of this invention, and the two coatings sequentially or simultaneously radiation cured.

The primary and/or secondary coatings may be applied and cured by any method known in the art. A preferred method, whereby two coatings are applied wet-on-wet, is disclosed in U.S. Pat. No. 4,474,830 to C. Taylor of AT&T Bell Laboratories. The coating or coatings may then be cured in situ, preferably by ultraviolet irradiation, to obtain a cured polymeric coating. Alternatively, the primary coating may be applied and cured, after which the secondary coating may be applied and cured.

D. The Primary Coating Composition of the Invention

In a preferred embodiment, the invention relates to a primary coating composition for an optical fiber which comprises the cured reaction product of the following ingredients:

(1) from about 10 to about 80 percent by weight of one or more acrylate- or methacrylate-terminated urethane oligomers;

(2) from about 10 to about 75 percent by weight of one or more monomer diluents; and (3) from about 0 to about 3.0 percent by weight of an organofunctional silane adhesion promoter which binds in with the primary coating composition during cure; and (5) from about 0 to about 10.0 percent by weight of a photoinitiator.

All of these percentages are percentages by weight based on the weight of all ingredients. However, the coating ingredients are selected such that the cured coating material meets the low adhesion to glass as measured by the 180° peel back test, high percent elongation to break, and high tensile strength as described above.

E. Optical Ribbon Matrix

In making optical ribbons, a plurality of the coated optical fibers described above are coated by a matrix which holds together the plurality of fibers. The matrix is a polymer material coated on the fibers and then cured. Preferred matrix materials are disclosed by U.S. patent application Ser. No. 08/575,637 filed Dec. 20, 1995 (full peel type) and published European patent application 0 407 004 A2 (non-full peel type), both of which are incorporated herein by reference in their entirety.

The matrix composition is a radiation-curable liquid matrix composition, e.g., for affixing coated and inked optical fibers in a ribbon or other desired configuration. The matrix composition, when cured, should have, inter alia, the following properties: moisture resistance; solvent resistance; extreme ease of stripping; resistance to breakout failure; low volatiles, extractables and exudate content; absence of particulate material; absence of components which are harmful to human beings or to the cured composition; fast cure when irradiated; and long term thermal, oxidative and hydrolytic stability. It should be non-yellowing. It must be somewhat hard-curing, must have a high elongation to break, and must have superb release properties. It must, when cured, be strippable from the underlying fibers without being dissolved and without removing ink from the underlying fibers. It should also be resistant to failure during "cabling". Cabling is the term used to describe a process of gathering a plurality of the ribbons together to form a cable.

1. Non-Full Peel Matrix Composition

The non-full peel type of matrix material contains at least three basic ingredients, and, if envisioned for ultraviolet cure, at least four:

(a) a polyether-based urethane acrylate;

(b) a monomer having a plurality of acrylate or methacrylate groups;

(c) an alkyl acrylate or an alkyl methacrylate monomer; and (d) optionally, for a UV-curable composition, a photoinitiator.

The first ingredient is a specific urethane acrylate. Specifically, it is based on an aliphatic polyether polyol, which is reacted with an aliphatic polyisocyanate and acrylated.

In a preferred embodiment, this component is an oligomer which is silicone-modified, e.g., it may have silicone co-reacted into the polyether portion of the backbone. The silicone-modified alternative may provide the most desirable release characteristics vis-a-vis the ink (i.e., may exhibit less adhesion that the non-silicone-containing urethane acrylate).

The second component of the matrix material is a monomer having a plurality of acrylate or methacrylate moieties. This component, which may be difunctional or higher but which is preferably trifunctional, serves to increase the crosslink density of the cured coating and therefore to improve solvent resistance (by preventing absorption of solvent into the matrix) and to increase modulus.

The third component of the matrix material is an acrylate or methacrylate monomer having an alkyl moiety comprising from 7 to 18 carbon atoms.

One of the key features of a matrix is its optimized adhesion level, i.e., it has a high enough adhesion level to remain adhered under virtually all use conditions yet low enough to render it easily strippable for splicing. Further, the adhesion level of the matrix to the coated and inked fibers is variable to meet different use conditions.

This third component (c) is instrumental in conferring release properties to the matrix material vis-a-vis the coated, inked optical fibers. It is necessary that a field worker is able to peel away the matrix material without removing the ink which identifies the underlying coated optical fibers, to splice the fibers together correctly. Furthermore, the inclusion of this third component increases the hydrolytic stability of the matrix material relative to that of the composition not including it. Thus, even in embodiments, wherein increased (rather than decreased) adhesion is required, this adhesion decreasing component should be used in addition to a further component that is capable of overriding this adhesion decreasing property, the adhesion-increasing component replacing a portion of the above-described polyether urethane acrylate component.

The fourth component of the matrix material is a photoinitiator. The necessity for this component depends on the envisioned mode of cure of the matrix material: if it is to be ultraviolet cured, a photoinitiator is needed; if it is to be cured by an electron beam, the material may comprise substantially no photoinitiator.

The matrix material may also comprise one or more optional ingredients, such as adhesion increasing agents and stabilizers.

2. Full Peel Bonded Ribbon and Full Peel Matrix Composition

The full peel matrix material contains at least three basic components, and, if envisioned for ultraviolet cure, at least four:

(a) a wholly aliphatic urethane acrylate;
(b) one or more monomers reactive therewith;
(c) a release agent; and
(d) optionally, for a UV-curable composition, a photoinitiator.

The first component is a wholly aliphatic urethane acrylate oligomer. Preferably, it is based on an aliphatic polyether polyol, which is reacted with an aliphatic polyisocyanate and acrylated. The wholly aliphatic urethane acrylate oligomer comprises from about 20 percent to about 90 percent by weight of the matrix material (composition), based on the total weight of the ingredients. Furthermore, the material should swell less than about 40% in length, and preferably, at least in some embodiments, less than about 10% in length, when soaked in gasoline for about 4 hours at room temperature.

The second component of the composition is a reactive monomer having one or more acrylate or methacrylate moieties per monomer molecule, and which is one which results in a hard curing (high modulus) coating, of a suitable viscosity for application conditions.

The third component of the matrix composition is one or more components which contribute to the release properties of the cured composition from the inked substrate when cured. Unlike some prior art applications, the release agent is intimately admixed with the other components of the matrix, conferring a "one-part" homogenous system.

An essential characteristic of the release agent is that it is not in particulate form because the overall matrix composition is to be substantially free of particulate material. By "substantially free of particulate material" is meant that, per gram of liquid sample, less than or equal to 10 particles of 5–25 micron size, less than or equal to 2 particles of 25–50 micron size, and less than or equal to 1 particle of 50 micron size, and less than or equal to 1 particle of 50 microns or greater are detectible, as determined by laser particle count.

The release agent (C) may comprise either nonreactive or reactive components, or a combination of the two. Overall, if less than about 0.05 percent of the release agent (C) is used, adhesion may be too high and poor release and poor peelability may result. If more than about 15.0 percent of the (C) component is used, as when reactive release agents are used, however, incompatibility in the liquid and resultant imperfections in the cured matrix composition may result. It is highly desirable that, when a nonreactive release agent is employed, it is effective in a small amount, i.e., preferably less than 2.0 percent of the composition, to keep amounts of volatiles, extractables and exudates in the cured composition as low as possible.

Silicone release agents are preferred because they improve coefficient of friction, which is helpful for ease of spooling and cabling. Another preferred release agent is a combination of a nonreactive release agent such as an alkyl-pendant silicone copolymer and a reactive release agent such as an acrylate functional polyester-modified dimethyl siloxane, in a ratio of about 1:4, or a (reactive) acrylated silicone alone.

The fourth component of the matrix composition is a photoinitiator. The necessity for this component depends on the envisioned mode of cure of the matrix composition: if it is to be ultraviolet cured, a photoinitiator is needed; if it is to be cured by an electron beam, the material may comprise substantially no photoinitiator.

The matrix material may also comprise one or more optional ingredients, such as stabilizers or antioxidants.

The full peel matrix material which is prepared and cured in accordance with the invention should have a tensile modulus at 25° C. of about 10,000 psi to about 200,000 psi (about 70 MPa to about 1,400 MPa); preferably about 25,000 psi to about 175,000 psi) about 170 MPa to about 1,200 MPa); and more preferably about 40,000 to about 150,000 psi (about 275 to about 1,000 MPa) (per ASTM D-882); a glass transition temperature of less than about 110° C. (peak); an elongation to break of at least 20% and preferably at least 40% (per ASTM D-882); tensile (rupture) strength of at least about 1,000 psi, preferably at least about 2,000 psi, (per ASTM D-882); good release from ink (i.e., generally requiring about 1 or 2 grams or so of force to perform a 180° peel test); low surface tack; fast cure; and high thermal, oxidative and hydrolytic stability over the long term.

The above-described combination of high modulus and high elongation to break is believed to be a factor which results in a coating which does not fragment when peeled away from the fiber, in the preferred embodiments as an intact, unitary structure, resulting in a "full peel" matrix material which may be thus removed easily and completely without first dissolving it.

F. The Optical Fiber Ribbon Assembly

The invention further relates to an optical fiber ribbon assembly. The ribbon assembly generally comprises a plurality of coated, inked optical fibers held in a fixed relationship, e.g., in a parallel and planar or other prescribed arrangement, and a radiation curable matrix material, in which the fibers are embedded, the matrix bonding the fibers in the desired arrangement. The matrix material has sufficient adhesion to the fibers to remain adhered thereto during use but is easily strippable therefrom without substantially damaging the integrity of an ink layer on the coated optical fibers. As noted above, ink is optional. Coloring may be entirely omitted, supplied by ink or supplied by employing a pigmented secondary coating.

The optical fibers which are part of the ribbon are those known in the art which are singly or dually coated before being bonded in the matrix material and which contain an ink layer on their surface, rendering each distinguishable from other fibers in the ribbon.

As discussed hereinabove, in order for the optical fiber ribbons to be spliced in a reasonably easy manner, it is desirable to identify the individual fibers by color coding them. It is possible to add a coloring agent to the outermost fiber coating layer; however, this is impractical because the coating will impart its color to the apparatus used to apply it, requiring numerous sets of drawing and coating apparatuses to accommodate each color of ink used.

Thus, it is more efficacious to ink over the optical fiber coating or coatings ink-containing layers of different colors, for individual fiber identification, by any means known in the art. The applied ink composition may be variable in nature but generally is vinylic and may comprise, for example, one or more organic or inorganic pigments; a vinyl copolymer; synthetic silica; and an organic solvent. As described above, the precise nature of the ink composition will dictate the amounts and nature of the adhesion-affecting components in the matrix. The ink may be a UV curable ink or may be an ink curable by other methods.

The matrix material which bonds the fibers is of the type which constitutes the present invention, i.e., one which comprises:

(a) from about 35 percent to about 98 percent by weight of an aliphatic polyether-based urethane acrylate;

(b) from about 0.5 percent to about 35 percent by weight of a monomer having a plurality of acrylate or methacrylate moieties;

(c) from about 0.5 percent to about 20 percent by weight of an acrylate or methacrylate monomer having an alkyl moiety comprising from 7 to 18 carbon atoms; and (d) from about 0 percent to about 10 percent by weight of a photoinitiator, all of said percentages by weight being based on total weight of (a), (b), (c) and (d).

One kind of ribbon structure, and a cable made from such ribbon, is described in U.S. Pat. No. 3,411,010 to Genähr et al, which is incorporated herein by reference.

G. Process for Preparing an Optical Fiber Ribbon

The invention comprises, in a further aspect, a process for preparing an optical fiber ribbon. Broadly, the process comprises mechanically arranging coated and inked fibers in a desired (i.e., generally planar and generally parallel) configuration; applying a matrix material composition about the fibers; and curing. As noted above, the ink is optional. Coloring may be entirely omitted, supplied by ink or supplied by employed a pigmented secondary coating.

A suitable but non-limitative means for applying the matrix material to the fibers is as follows. The fibers, e.g., twelve fibers, are aligned parallel in a single plane. Each of the fibers has a different color. Then the aligned fibers are drawn together through a die to apply the matrix material. The aligned fibers exit the die with a coating of wet matrix material. The wet matrix may be then radiation cured, preferably either by ultraviolet light irradiation or via electron beam. The resulting ribbon contains the fibers bonded and secured in the desired disposition (i.e., generally parallel and generally planar). The adhesive bond of the cured matrix material to the coated and inked fibers may be adjusted by incorporation into the uncured compositions of a component capable of increasing the adhesive bond of the type discussed, supra, e.g., a polyester-based aliphatic urethane acrylate oligomer.

H. Measurement of Adhesion, Tensile Strength and Elongation to Break

1. Adhesion Measured by the 180° Peel Back Test

The adhesion of the material of the primary coatings of the present invention to the glass is measured by a 180° Peel Back Test. The peel test is conducted as follows.

Put tape 42 (FIG. 2) on microscope slides (not shown) along the edges of a clean glass plate 38. The tape 42 should completely cover the glass slides. These slides serve as runners 41 for a Bird applicator. Then clean the glass plate 38 and runners of tape 42.

Figure 2:
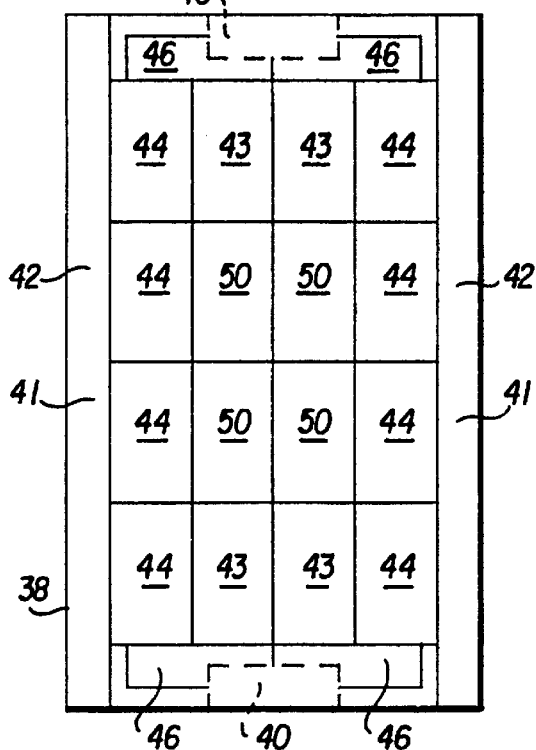
FIG. 2 shows a test slide apparatus for preparing samples for measuring by a 180° peel back test.

Arrange microscope slides as spacer slides 43, 44, 46 and test slides 50 on the glass plate 38 between the runners 41 as shown in FIG. 2. The fit between the runners 41 must be tight and the slides 43, 44, 46 and 50 must lay flat against the glass plate 38. After ensuring this, tape the slides 46 on the ends to the glass plate 38 using tape 40. Care must be taken not to touch the slides 50 on their test surfaces as this will affect the results of the test. They should be handled only by their edges.

Spread the primary coating on the slides using a 3 mil Bird applicator and cure the primary coating in air at a 0.7 J/cm$^2$ UV dose. Then spread a secondary optical fiber coating to completely cover the primary coating and extend onto slides 46 not covered by the primary coating. Then the secondary coating is cured in air by a 0.7 J/cm$^2$ UV dose. Afterwards one inch wide strips are cut lengthwise through the cured coatings on the slides 43, 46 and 50.

Figure 2A:
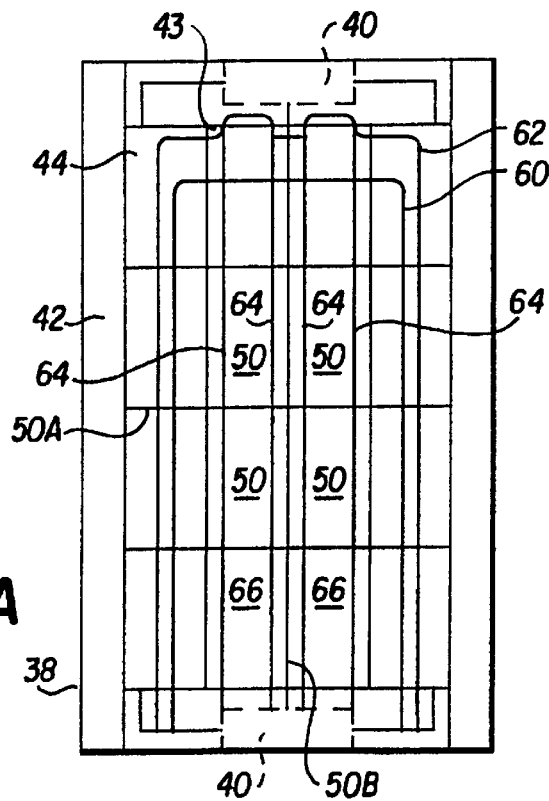
FIG. 2A shows the apparatus of FIG. 1 coated with primary and secondary coating.

FIG. 2A shows the resulting slides 44, 46 and 50 on the plate 38, coated with the primary coating 60, the secondary coating 62 and having cut lines 64 marking where strips 66 are cut.

Figure 2B:
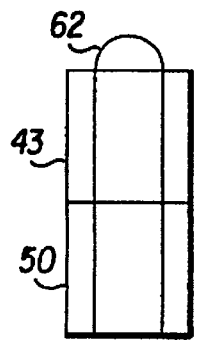
FIG. 2B shows a sample cut from the coated apparatus of FIG. 2A.
Figure 2C:
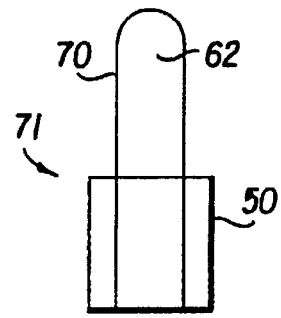
FIG. 2C shows a test sample derived from the sample of FIG. 2B.
Figure 2D:
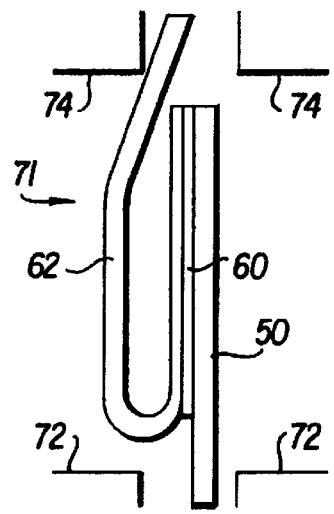
FIG. 2D shows the sample of FIG. 2C in the jaws of an INSTRON tester.

Then the slides 43, 44, 46 and 50 are lifted off the plate 38 and slides 44 and 46 are cut away. However, tabs of secondary coating 62 on the slides 46 are not cut. Then the coatings are cut along lines 50A, 50B of FIG. 2A to result in four double slides with tabs. One such slide is shown in FIG. 2B. Then the spacer slide 43 of FIG. 2B is removed (typically with the aid of a razor blade) to result in a sample 71 having a "tab" 70 of cured secondary coating 62 as shown on FIG. 2C. All of the cured material on the slide 50 is left in place.

To measure 180° peel back, a clip (not shown) is attached to the slide 50 of the sample 71 on the end opposite that of the secondary coating tab 70. Then the slide 50 of the sample 71 is hung with the tab 70 pointing downward in a 23° C., 50% relative humidity conditioner for 16 to 24 hours. After such conditioning, the sample 71 is loaded into the jaws 72, 74 of an INSTRON tensile tester within the environmental chamber of the INSTRON tensile tester. The chamber being maintained at 25° C. and 50% relative humidity. The INSTRON tester is set to the following settings:

a. Full Scale Load—0.1 kg.

b. Chart Speed—20 mm/min c. Gauge Length—3.25 in d. Crosshead Speed—20 mm/min e. Load Cell—2 kg The sample 71 is positioned in the INSTRON tester to be vertically aligned and such that the secondary coating tab is not touching the slide 50 near the top jaw 74 of the INSTRON tester. The jaws 74 are closed together to hold the tab 62 and the jaws 72 are closed to hold the slide 50. There should be no preloaded tension on the sample 71.

Figure 2E:
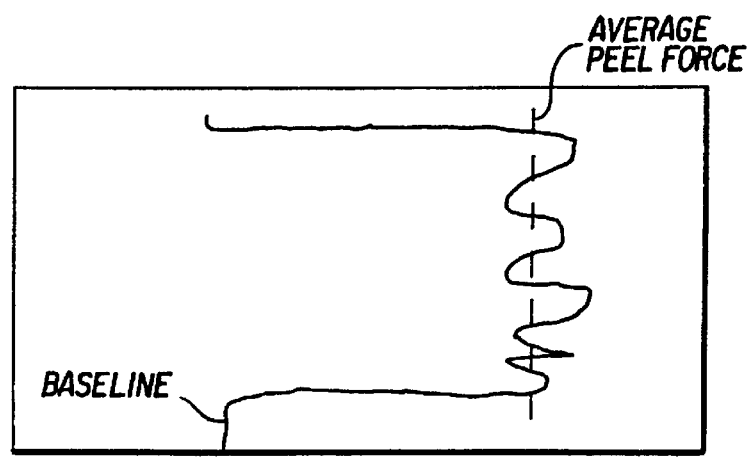
FIG. 2E shows a schematic of a typical peel force chart resulting from measuring the sample in the INSTRON tester of FIG. 2D.

When the required humidity and temperature are reached, the baseline on the INSTRON chart is checked to ensure it is flat. At this point, the sample 71 can be pulled. Continue the pull until an upper limit switch is reached. The resulting INSTRON chart readout will appear as shown in FIG. 2E. From this chart readout, the average peel force can be visually estimated. The baseline value should be subtracted from the visually estimated average peel force to give the final average peel force.

2. Tensile Strength

Tensile strength of the material for the primary coating is measured by making a cured sample of this material shaped as strips about a two inch gauge length, a half inch wide and 6 mils thick. Then the sample is tested according to ASTM D-882.

3. Percent Elongation to Break

Percent elongation to break of the material for the primary coating is measured at the same time as is tensile strength.

EXAMPLES

The following Examples serve to further illustrate the invention. In these Examples and elsewhere throughout this application, all parts and percentages are by weight, on a dry solids basis, and all temperatures are in degrees centigrade unless expressly stated to be otherwise. In all of the Examples, cure doses were measured with an International Light IL 390 radiometer. Typically samples were ultraviolet cured in air at 0.7 J/cm$^2$ using a 200 watts per inch medium pressure mercury vapor lamp, unless stated otherwise. Unless otherwise noted, throughout the Examples and the remainder of this specification, "modulus" refers to 2.5% tensile modulus, at 25° C., measured using an Instron Model 1122 tensile tester, per ASTM-D882. The parameters of 180° Peel Force, tensile strength and percent elongation to break are measured as stated above.

As in the remainder of the application, parts by weight in the Examples refers to the total composition described in that Example, including all ingredients. It should be noted that the Examples all employ ultraviolet cure.

Example 1

The following composition was made up as a 50 gram batch from the ingredients listed on TABLE 2.

TABLE 2

| Ingredient | Weight % |
| --- | --- |
| IRR 245 oligomer[1] | 48.00 |
| ARONIX M-114 monomer diluent[2] | 31.99 |
| AGEFLEX FA-12 monomer diluent[3] | 12.00 |
| IRGACURE 184 photoinitiator[4] | 6.00 |
| IRGANOX 1035 stabilizer[5] | 1.00 |
| IOMP chain transfer agent[6] | 0.50 |
| A189 adhesion promoter[7] | 0.50 |
| A1110 stabilizer[8] | 0.01 |

Footnotes:
[1]IRR 245 polyether-based acrylated aliphatic urethane oligomer from UCB Chemicals Corp., Smyrna, Georgia.
[2]ARONIX M-114 nonylphenol ethoxylate acrylate monomer diluent, from Toagasei Chemical Industry Company, Ltd., Tokyo, Japan.
[3]AGEFLEX FA-12 lauryl acrylate monomer diluent from CPS Chemical Co., Inc., Old Bridge, NJ.
[4]IRGACURE 184 hydroxycyclohexylphenyl ketone photoinitiator, from Ciba-Geigy, Ardsley, NY.
[5]IRGANOX 1035 thiodiethylene bis (3,5-di-tert-butyl-4-hydroxy) hydrocinnamate stabilizer, from Ciba-Geigy, Ardsley, NY.
[6]Isoctyl-3-mercaptopropionate chain transfer agent from Evans Chemetics, division of W. R. Grace Co., Lexington, Mass.
[7]A189 3-mercaptopropyl trimethoxysilane, plus impurities, e.g., 15 weight percent impurities; adhesion promoter, from OSi Specialties Inc., Danbury, CT.
[8]A1110 3-aminopropyltrimethoxysilane stabilizer, from OSi Specialties, Inc., Danbury, CT.

To make a lab batch, with the above ingredients, 48.00 gms of IRR 245 as a solid(oligomer), 6.00 gms of IRGACURE 184 as a powder, and 1.00 gms of IRGANOX and 12.00 gms of AGEFLEX monomer were added to the mixture. Then the mixture was put on a hot plate and warmed to dissolve the powders, but the mixture was not warmed to more than 60° C. The mixture was mixed with a knife until clear and homogeneous (primary coating was clear but possibly had a yellow tint). Then the mixture was cooled to ≦90° F. by taking it off the hot plate, and mixing with the knife. Then IOMP liquid and A189 liquid were added and mixed until homogenous. The above uncured composition had a viscosity of 7510 cps measured at 25° C. with a Brookfield No. 34 spindle.

A 6 mil coating of this composition was applied to a flat glass sheet using a Bird applicator and cured in air at 0.7 J/cm$^2$ using a 200 watts per inch Conrad Hanovia medium pressure mercury vapor lamp. A tensile modulus for this coating of 210.8 psi was measured according to ASTM-D882. A refractive index (RI) of 1.4772 was measured.

There were differences between making the material of this example on a lab scale and a plant scale. In particular, a larger batch primary coating material, was made in a 55 gallon drum. Then 122.50 lbs. M-114, 152.25 lbs. IRR 245, 45.50 lbs. AGEFLEX FA-12 lauryl acrylate monomer, 21.00 lbs. IRGACURE 184, and 3.50 lbs. IRGANOX 1035 were added and mixed for ½ hour to form a mixture. The monomer was added first, then oligomer was added in a high speed mixer (the oligomer was preheated to about 140° F. to soften/liquify it). Then 8.05 grams of A1110 was added to the mixture and mixed for 5 minutes. Then 3.50 lbs. IOMP and 1.93 lbs. A189 were added and mixed for 10 minutes. The mixture had a viscosity of 8250 cps. Then 3.50 lbs. of AGEFLEX FA-12 was added to reduce the viscosity to 7500 cps.

The material from the plant scale lot was coated as a primary coating onto glass optical fibers. To this a conventional secondary coating was applied. The secondary coating was similar (but for mainly a lack of isobornyl acrylate) to that of Example 13 of U.S. Pat. No. 5,352,712 to Shustack, this patent incorporated herein by reference in its entirety. The secondary coating was made from a mixture of the following composition: PHOTOMER 6008 oligomer, 35 weight percent, and PHOTOMER 6010 oligomer, 35 weight percent (both oligomers available from Henkel Corp. Ambler, Pa.); IRGACURE 184 photoinitiator[4], 4 weight percent; IRGANOX 1035 stabilizer[5], 1 weight percent; (see TABLE 2 for footnotes); HDODA (hexanedioldiacrylate), 24.995 weight percent; and DC 57 silicone additive, 0.005 weight percent (available from Dow-Coming Corporation, Midland, Mich.).

Then a fiber optic ink was applied. The inked fibers were then joined together in a parallel array to form an optical ribbon. The fibers in the ribbon were held together using a UV cured matrix material.

Figure 3:
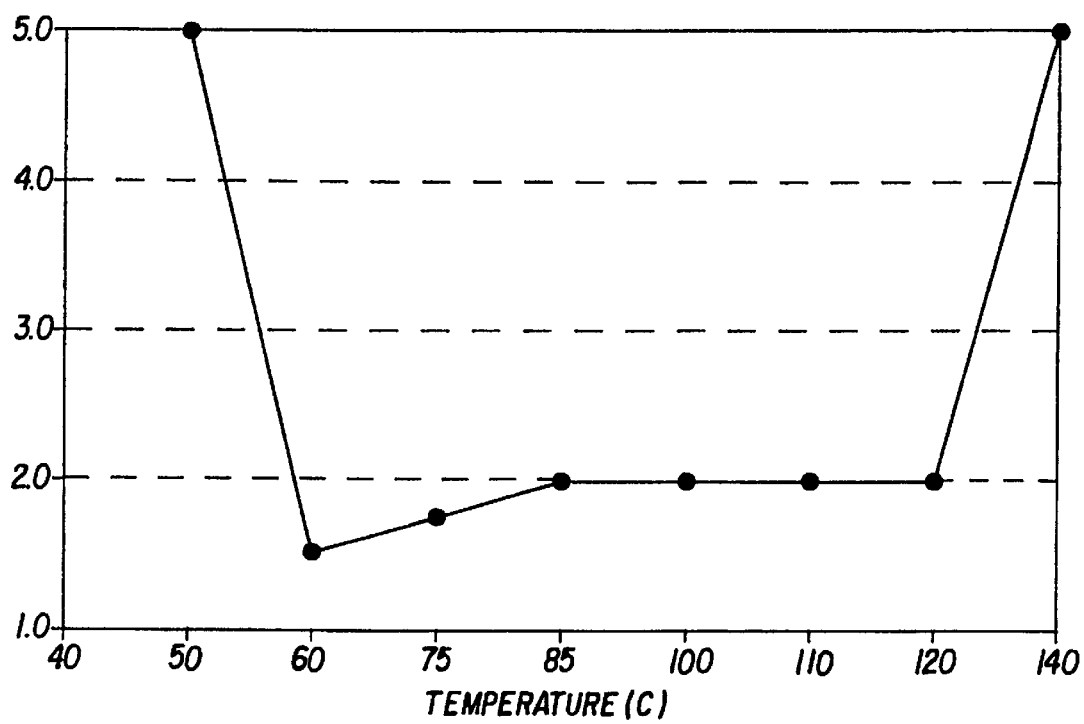
FIGS. 3, 4, 5, 6 and 7 are plots of stripping data.

The optical ribbon was then subjected to stripping with a Sumitomo tool JR-4A over a temperature range. FIG. 3 shows the resulting data for cleanliness. The primary coating material of FIG. 3 was the material from the above-listed plant scale run. The cleanliness rating from 1 to 5 on FIG. 3 is defined in Table 3. Table 3 as lists Cleanliness and "Tube Off," which correspond to the particular cleanliness rating. Tube Off of Table 3 is the state of the material stripped from the glass. It is preferred if the material strips off as a single tube.

TABLE 3

| Cleanliness | Tube Off |
|---|---|
| 1. No visible particles at 2× magnification | Material removed as tube, no deform |
| 2. At 2×, less than 20 particles are visible per 30 mm stripped length | Material removed as 1 unit, slight deformation at blade |
| 3. At 2×, more than 20 particles are visible per 30 mm stripped length but they are removed with 1 alcohol wipe | Material removed as unit; considerable deformation at blade |
| 4. At 2×, more than 20 particles are visible, per 30 mm stripped length but they are too many to remove with 1 wipe | Removed as pieces |
| 5. Particles adhere to fiber and do not remove with wipe | Removed as powder |

FIG. 3 shows good cleanliness upon stripping in the 60°–120° C. temperature range.

Figure 4:
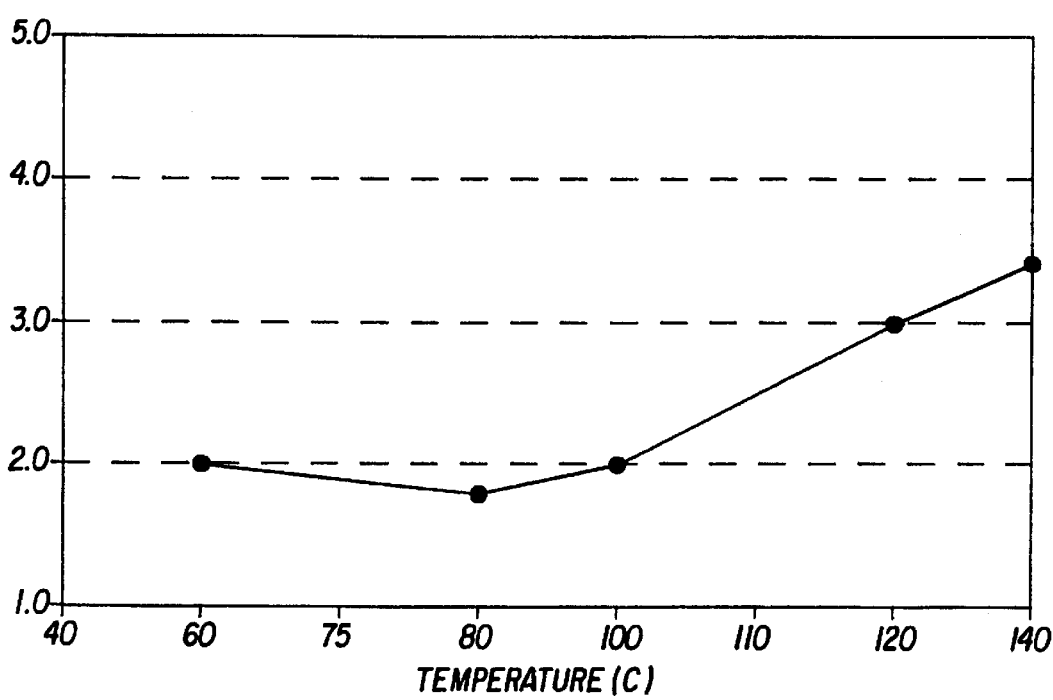

FIG. 4 shows a cleanliness rating for optical ribbon of optical fiber coated with the same primary coating, same matrix, and same ink, as employed in the ribbons tested to obtain the data of FIG. 3, but employing a different secondary coating. The primary coating material of FIG. 4 is the material of the above described plant scale run. FIG. 4 shows good cleanliness for stripping between 60° C. and about 120° C.

Example 2

A composition of the present invention was prepared from the ingredients listed on TABLE 4 by a procedure similar to that used for Example 1.

TABLE 4

| Ingredient | Weight % |
|---|---|
| IRR 245 oligomer[1] | 48.00 |
| Ph 4003 monomer[9] | 31.99 |
| AGEFLEX FA-12 monomer diluent[3] | 12.00 |
| IRGACURE 184 photoinitiator[4] | 6.00 |
| IRGANOX 1035 stabilizer[5] | 0.01 |
| IOMP chain transfer agent[6] | 0.50 |
| A189 adhesion promoter[7] | 0.50 |
| A1110 stabilizer[8] | 0.01 |

To make a batch of primary coating material, 112 lbs. Ph 4003, 168 lbs. IRR 245, 21 lbs. IRGACURE 184, 3.5 lbs. IRGANOX 1035, and 42 lbs. AGEFLEX FA-12 lauryl acrylate were mixed for ½ hour in a 55 gallon drum. Then 8.30 grams of A1110 was added to the vortex of the mixture. The mixture was mixed a further 5 minutes. Then to the vortex of the mixture was added 2.28 lbs. IOMP and 1.96 lbs A189. The viscosity was 9600 cps. Then 1 lb. AGEFLEX FA-12 and 7 lbs. Ph 4003 were added. This viscosity was 9000 cps. Then 3.5 lbs AGEFLEX FA-12 and 7 lbs. Ph 4003 were added to the mixture. The viscosity was 8100 cps. Finally, 9.02 gm. A1110, 0.58 lbs. IOMP, 0.14 lbs. A189 and 7.00 lbs. AGEFLEX FA-12 were added to the mixture. The uncured composition had a viscosity, as measured using a Brookfield viscometer at the above-noted parameters, of about 6950 cps.

When cured in the manner of Example 1, a tensile modulus, per ASTM-D882, of 204.2 psi was recorded, and a refractive index of 1.4779 was noted. Also, a 180° peel force of 4.9 gms, a percent elongation to break of 140.6%, and a tensile strength of 153.8 psi were measured.

Figure 5:
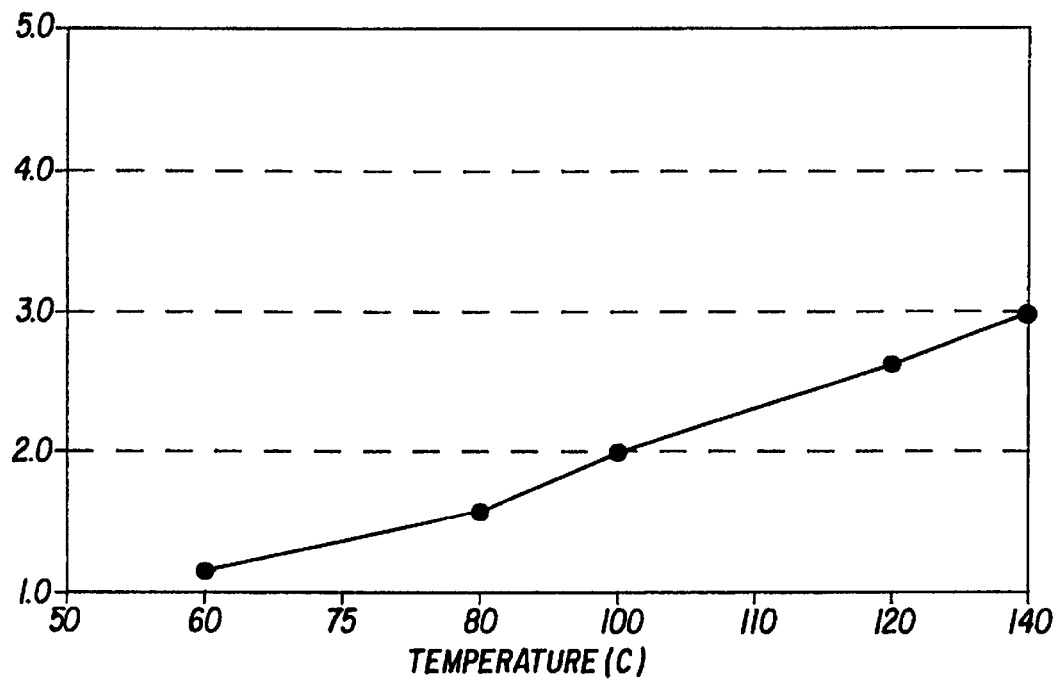

FIG. 5 shows cleanliness rating for stripping an optical ribbon comprising a glass fiber clad with a primary coating of the material prepared according to this example and the secondary coating, ink, and matrix as employed in the samples tested to obtain the data of FIG. 4. FIG. 5 shows good cleanliness ratings at stripping temperatures from 60° to 120° C.

Example 3

A ribbon was made employing the same secondary coating, ink and matrix employed in the samples tested to obtain the data of FIG. 3, with another primary coating of the present invention made from the ingredients listed in TABLE 5.

TABLE 5

| Ingredient | Weight % |
|---|---|
| IRR 245 oligomer[1] | 42.00 |
| Ph 4003 monomer diluent[9] | 50.00 |
| IRGACURE 184 photoinitiator[4] | 6.00 |
| IRGANOX 1035 stabilizer[5] | 1.00 |
| IOMP chain transfer agent[6] | 0.50 |
| A189 adhesion promoter[7] | 0.49 |
| A1110 stabilizer[8] | 0.01 |

The coating material was prepared as follows. Into a clean 55 gallon drum were added 91.00 lbs. Ph 4003 monomer, 70.00 lbs. IRR 245 oligomer, 10.50 lbs IRGACURE 184 photoinitiator, and 1.75 lbs. IRGANOX 1035 stabilizer. This was mixed in a mixer for ½ hour. Then 0.88 lbs. IOMP chain transfer agent and 0.96 lbs. A189 adhesion promoter was added to the vortex in the mixer and mixed for 10 minutes. The mixture was subsequently filtered.

The product had a viscosity of 5810 cps. Also, it had a 180° peel back force of 4.0 grams, a tensile strength of 246.4 psi, and a percent elongation to break of 115.0%.

Figure 6:
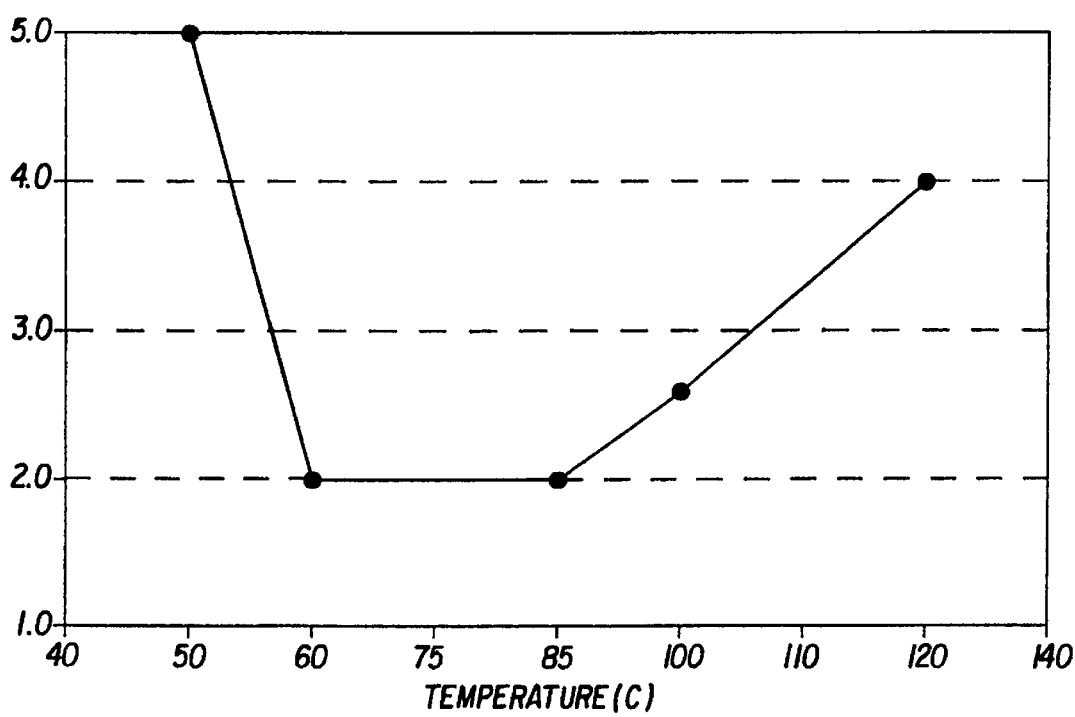

FIG. 6 shows cleanliness data for stripping a ribbon comprising an optic fiber coated with a primary coating of the above described materials, and a secondary coating, ink, and matrix employed to obtain the data of FIG. 3. FIG. 6 shows good cleanliness for the ribbon stripped at a temperature from about 60° to about 100° C.

Example 4

A composition of the present invention was prepared from the ingredients listed in TABLE 6.

TABLE 6

| Ingredient | Weight % |
|---|---|
| IRR 245 oligomer[1] | 37.00 |
| Ph 4003 monomer[9] | 54.00 |
| IRGACURE 184 photoinitiator[4] | 6.00 |
| IRGANOX 1035 stabilizer[5] | 1.00 |
| IOMP chain transfer agent[6] | 1.00 |
| A189 adhesion promoter[7] | 0.49 |
| A1110 stabilizer[8] | 0.01 |
| A0397[10] | 0.50 |

Example 5

Another composition of the present invention was made from the ingredients listed in TABLE 7.

TABLE 7

| Ingredient | Weight % |
| --- | --- |
| IRR 245 oligomer[1] | 38.00 |
| Ph 4003 oligomer[9] | 55.50 |
| LUCIRIN LR 8893[11] | 3.05 |
| LUCIRIN TPO[12] | 0.95 |
| IRGANOX 1035 stabilizer[5] | 1.00 |
| IOMP chain transfer agent[6] | 1.00 |
| A189 adhesion promoter[7] | 0.49 |
| A1110 stabilizer[8] | 0.01 |
| A0397[10] | 0.50 |

Figure 7:
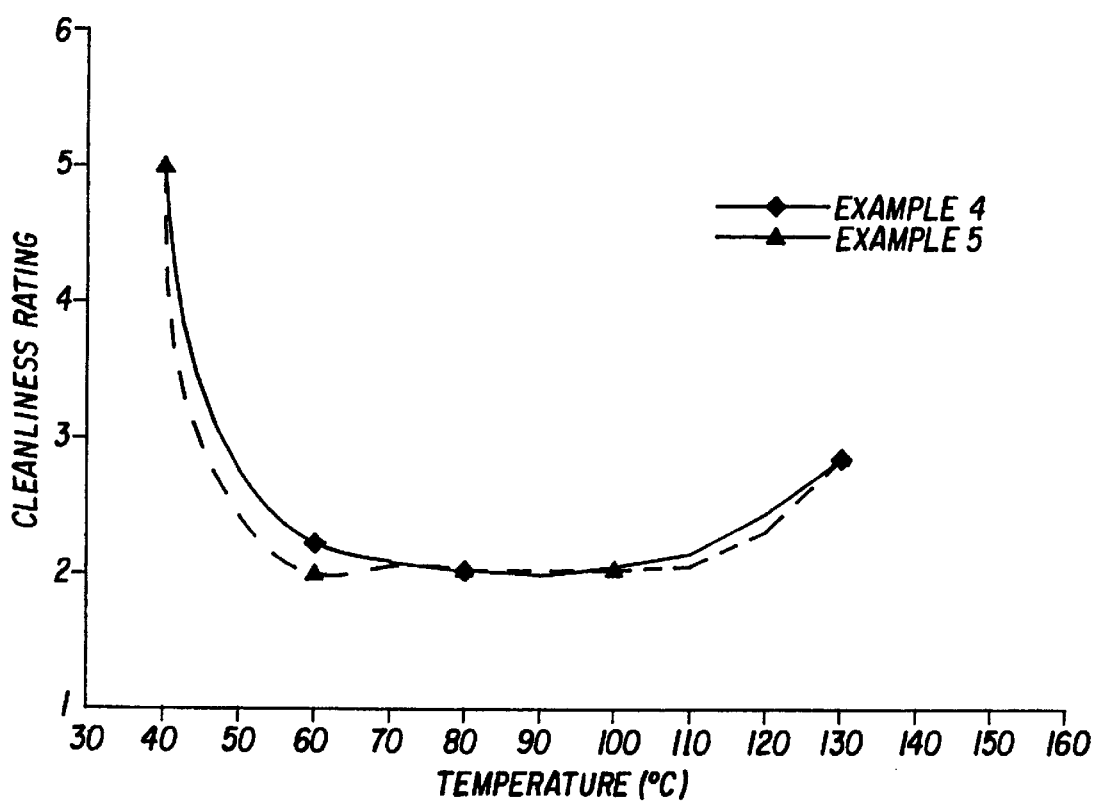

FIG. 7 shows ribbons comprising optic fibers, coated with a cured primary coating made from, respectively, the ingredients of TABLES 6 and 7, as well as the secondary coating, ink and matrix of EXAMPLE 3, have good cleanliness when stripped at temperatures from about 50° to about 130° C. Stripping was performed with a Sumitomo JR-4A Stripper.

Example 6

Another sample of the primary coating material of the present invention was made of the ingredients listed in TABLE 8.

TABLE 8

| Ingredient | Weight % |
| --- | --- |
| IRR 245 oligomer[1] | 24.00 |
| PURELAST 590A oligomer[13] | 12.00 |
| Ph 4003 monomer[9] | 56.50 |
| IRGACURE 184 photoinitiator[4] | 6.00 |
| IRGANOX 1035 stabilizer[5] | 1.00 |
| A189 adhesion promoter[7] | 0.49 |
| A1110 stabilizer[8] | 0.01 |

This material after curing had a 0.7 J/cm$^2$ Modulus of 138.0 psi and 0.2 J/cm$^2$ Modulus of 101.7 psi. The average tensile strength of three cured samples was 182.3 psi and the average percent elongation to break of three cured samples was 135.7%. The average 180° peel force was measured as 10.5 g.

Example 7

Another sample of the primary coating material of the present invention was made with the ingredients listed in TABLE 9.

TABLE 9

| Ingredient | Weight % |
| --- | --- |
| BR 582 oligomer[14] | 18.00 |
| RX 01203[15] | 18.00 |
| Ph 4003 monomer[9] | 56.50 |
| IRGACURE 184 photoinitiator[4] | 6.00 |
| IRGANOX 1035 stabilizer[5] | 1.00 |
| A189 adhesion promoter[7] | 0.49 |
| A1110 stabilizer[8] | 0.01 |

The uncured material had a viscosity of 8310 cps. This material after curing had a modulus of 255.0 and an elongation to break of 84.6%. The force of 180° peel back was 3.0 grams.

Example 8

Another sample of the primary coating material of the present invention was made with the ingredients listed in TABLE 10.

TABLE 10

| Ingredients | Weight % |
| --- | --- |
| IRR 245 oligomer[1] | 18.00% |
| BR 582 oligomer[14] | 18.00% |
| Ph 4003 monomer[9] | 56.50% |
| IRGACURE 184 photoinitiator[4] | 6.00% |
| IRGANOX 1035 stabilizer[5] | 1.00% |
| A 189 adhesion promoter[7] | 0.49% |
| A 1110 stabilizer[8] | 0.01% |

The uncured material had a viscosity of 8120 cps. The material after curing had a 0.7 J/cm$^2$ modulus of 307.7 psi and a 0.2 J/cm$^2$ modulus of 267.9 psi. To this formulation was added 0.75% by weight of IOMP. The modulus was then measured as 227.7 psi. The percent elongation to break was 86.7% and the tensile strength was 180.3 psi. The force of 180° peel back was 2.4 grams.

Example 9

Another sample of the primary coating material of the present invention was made with the ingredients listed in TABLE 11.

TABLE 11

| Ingredients | Weight % |
| --- | --- |
| PURELAST 569 oligomer[16] | 20.00 |
| IRR 245 oligomer[1] | 20.00 |
| Ph 4003 monomer[9] | 51.54 |
| IRGACURE 184 photoinitiator[4] | 6.00 |
| IRGANOX 1035 stabilizer[5] | 1.00 |
| IOMP chain transfer agent[6] | 0.01 |
| A189 adhesion promoter[7] | 0.49 |
| A0397 adhesion promoter[10] | 0.95 |
| A1110 stabilizer[8] | 0.01 |

Viscosity at 25° C. of the mixture before curing was 5865 centipoise. This material after curing had a 0.7 J/cm$^2$ Modulus of 153.8 psi and a 0.2 J/cm$^2$ Modulus of 105.9 psi. The average 180° peel force of three cured samples was measured as 9.1 g. The average percent elongation to break of three cured samples was 110.3%. The average tensile strength of three cured samples was 117.8 psi.

This material was coated onto glass optical fibers. To this a conventional secondary coating was applied. The secondary coating was similar to those in U.S. Pat. No. 5,352,712 to Shustack and included 52.5 weight percent PHOTOMER 6019 oligomer, 21.40% PHOTOMER 6010 OLIGOMER, 3.05% IRGACURE 184 photoinitiator, 0.95 weight percent LUCERIN TPO photoinitiator, 1 weight percent IRGANOX 1035 stabilizer, 20 weight percent HDODA, 1 weight percent BYK 371 silicone additive (available from BYK Chemie, Wallingford, Conn.) and 0.1 weight percent TEGO-RAD 2200 silicone additive (available from Tego Chemie, Hopewell, Va.).

Then a fiber optic ink was applied. The inked fibers were then joined together in a parallel array to form an optical ribbon. The fibers in the ribbon were held together using a UV cured matrix material as in the above examples.

The optical ribbon was then subjected to stripping with a Sumitomo tool JR-4A. The tool was set to 100° C. for a 5 second dwell time and then the ribbon was hand stripped.

As a result a cleanliness rating of 3.0 and a tubeoff rating of 1.0 were measured.

Example 10

Another sample of the primary coating material of the present invention was made with the ingredients listed in TABLE 12.

TABLE 12

| Ingredients | Weight % |
| --- | --- |
| RX 01099[17] | 55.00 |
| Ph 4003[9] | 30.55 |
| N-vinyl caprolactam[18] | 9.00 |
| IRGACURE 184 photoinitiator[4] | 2.00 |
| IRGANOX 1035 stabilizer[5] | 1.00 |
| IOMP chain transfer agent[6] | 1.00 |
| A189 adhesion promoter[7] | 0.49 |
| A0397 adhesion promoter[10] | 0.95 |
| A1110 stabilizer[8] | 0.01 |

Viscosity at 25° C. of the mixture before curing was 10320 centipoise. This material after curing had a 0.7 J/cm$^2$ Modulus of 190.8 psi and a 0.2 J/cm Modulus of 179.8 psi. The average 180° peel force of three cured samples was measured as 32.0 g. The average percent elongation to break of three cured samples was 100.5%. The average tensile strength of three cured samples was 215.8 psi.

The above-described material was employed in the same procedure for making and testing an optical ribbon as in Example 9. The matrix material employed was as in Example 9. However, the secondary coating included 36 weight percent CN 983 oligomer from Sartomer Co., Exton, Pa., 36 weight percent ALU 351 oligomer from Echo Resins and Laboratory, Versailles, Mo., 3.05 weight percent IRGACURE 184, 0.95 weight percent LUCERIN TPO, 1 weight percent IRGANOX 1035, 1 weight BYK 371, 0.1 weight percent TEGORAD 2200, and 21.9 weight percent HDODA.

As a result a cleanliness rating of 3.0 and a tubeoff rating of 4.0 were measured.

Example 11

Another sample of the primary coating material of the present invention was made with the ingredients listed in TABLE 13.

TABLE 13

| Ingredients | Weight % |
| --- | --- |
| STC3-149 oligomer[19] | 50.00 |
| Ph 4003 monomer[9] | 41.99 |
| IRGACURE 184 photoinitiator[4] | 6.00 |
| IRGANOX 1035 stabilizer[5] | 1.00 |
| IOMP chain transfer agent[6] | 0.01 |
| A189 adhesion promoter[7] | 0.49 |
| A0397 adhesion promoter[10] | 0.50 |
| A1110 stabilizer[8] | 0.01 |

Viscosity at 25° C. of the mixture before curing was 7120 centipoise. This material after curing had a 0.7 J/cm$^2$ Modulus of 131.7 psi and a 0.2 J/cm Modulus of 107.7 psi. The average 180° peel force of three cured samples was measured as 26.4 g. The average percent elongation to break of three cured samples was 78.2%. The average tensile strength of three cured samples was 124.8 psi.

The above-described material was employed in the same procedure for making and testing an optical ribbon as in Example 10. This included employing the same material for the secondary coating and matrix as in Example 10.

As a result, a cleanliness rating of 3.0 and a tubeoff rating of 1.2 were measured.

It should be apparent that many modifications may be made to the above-described embodiments while remaining within the spirit and scope of the present invention. Thus, the present invention is not limited by the above-described embodiments, but only by the claims appended hereto.

What is claimed is:

1. A coated optical fiber comprising:
   an optical fiber; and
   a cured primary coating on the optical fiber
   wherein the primary coating is strippable from a portion of the optical fiber at a temperature in at least a portion of the temperature range from about 40° to about 200° C. by exerting a force to a portion of the primary coating about the portion of optical fiber in a direction parallel to the longitudinal axis of the glass fiber which is away from a portion of the primary coating remaining on the optical fiber, such that the exertion of force, followed by an optional one wipe with an alcohol laden piece of cloth or paper of the stripped portion of optical fiber, results in the stripped portion of optical fiber having substantially no residue of the primary coating as observable by a 2 power magnification.

2. The coated optical fiber of claim 1, wherein the primary coating is strippable at the temperature upon execution of the force to leave a ratio of less than 20 particles visible at a 2× magnification per 30 millimeters of stripped length.

3. The coated optical fiber of claim 2, wherein the primary coating is strippable at the temperature upon exertion of the force to leave a ratio of no particles visible at a 2× magnification per 30 millimeters of stripped length.

4. The coated optical fiber of claim 1, wherein the coating prior to curing has a freeze point of at most about 60° C.

5. The coated optical fiber of claim 4, wherein the freeze point is at most about 25° C.

6. The coated optical fiber of claim 4, wherein the freeze point is in the range from about 0° C. to about 60° C.

7. The coated optical fiber of claim 6, wherein the freeze point is in the range from about 5° C. to about 25° C.

8. The coated optical fiber of claim 1, wherein the primary coating is made of a material which is removable from a glass substrate by a peel force of less than 50 grams of force, as measured by a 180° peel back test at 50% relative humidity and room temperature, has an elongation to break of at least about 75% as measured by ASTM D-882, and has a tensile strength of at least about 80 psi as measured by ASTM D-882.

9. The coated optical fiber of claim 8, wherein the peel force is less than 20 grams of force.

10. The coated optical fiber of claim 9, wherein the peel force is less than 15 grams of force.

11. The coated optical fiber of claim 10, wherein the peel force is from about 5 to about 15 grams of force.

12. The coated optical fiber of claim 8, wherein the elongation to break is at least about 90%.

13. The coated optical fiber of claim 8, wherein the elongation to break is at least 100%.

14. The coated optical fiber of claim 8, wherein the elongation to break is about 100 to about 150%.

15. The coated optical fiber of claim 8, wherein the tensile strength is at least about 100 psi.

16. The coated optical fiber of claim 15, wherein the tensile strength is at least about 120 psi.

17. The coated optical fiber of claim 15, wherein the tensile strength is from about 120 to about 300 psi.

18. The coated optical fiber of claim 1, wherein said primary coating layer comprises a cured reaction product of from about 10 to about 80 percent by weight of one or more acrylate- or methacrylate-terminated urethane oligomers.

19. The coated optical fiber of claim 18, wherein said primary coating layer (b) further comprises the reaction product of, in addition to the acrylate or methacrylate-terminated oligomer from about 10 to about 75 percent by weight of one or more monomer diluents selected from the group consisting of:
(i) alkyl acrylate and alkyl methacrylate monomers having 6 to 18 carbon atoms in the alkyl moiety;
(ii) monomers having (i) an aromatic moiety, (2) a moiety containing acrylic or methacrylic unsaturation, and (3) a hydrocarbon moiety; and
(iii) mixtures thereof.

20. The coated optical fiber of claim 18, wherein said monomer diluent is selected from the group consisting of hexyl acrylate; hexylmethacrylate; ethylhexyl acrylate; ethylhexylmethacrylate; isooctyl acrylate; isooctyl methacrylate; octyl acrylate; octyl methacrylate; decyl acrylate; decyl methacrylate; isodecyl acrylate, isodecyl methacrylate; lauryl acrylate; lauryl methacrylate; tridecyl acrylate; tridecyl methacrylate; palmitic acrylate; palmitic methacrylate; myristyl acrylate; myristyl methacrylate; cetyl acrylate; cetyl methacrylate; 2-propenoic acid, 2-(((butyl)amino)carbonyloxy)ethylester, N-vinyl caprolactam; stearyl acrylate; stearyl methacrylate; C14–C15 hydrocarbon diol diacrylates; C14–C15 hydrocarbon diol dimethacrylates; phenoxyalkyl acrylate; phenoxyalkyl methacrylate; phenoxyalkyl alkoxylate acrylate; phenoxyalkyl alkoxylate methacrylate; para-cumylphenol ethoxylated acrylate, para-cumylphenol ethoxylated methacrylate; 3-acryloyloxypropyl-2-N-phenylcarbamate; isobornyl acrylate; isobornyl methacrylate, dicyclopentenylacrylate; dicyclopentenylmethacrylate; dicyclopentenyl ethoxylate acrylate; dicyclopentenyl ethoxylate methacrylate; tetrahydrofurfuryl acrylate; tetrahydrofurfuryl methacrylate; polyalkylene glycol nonylphenylether acrylates; polyalkylene glycol nonylphenylether methacrylates; caprolactone acrylate; and mixtures thereof.

21. The coated optical fiber of claim 18 wherein said primary coating layer additionally comprises from about 0.1 to about 3.0 percent by weight of an organofunctional silane adhesion promoter.

22. The coated optical fiber of claim 21, wherein said adhesion promoter is selected from the group consisting of acrylate-functional silanes; amino-functional silanes; mercapto-functional silanes; methacrylate-functional silanes; acrylamidofunctional silanes; alkyl-functional silanes; vinyl-functional silanes; and mixtures thereof.

23. The coated optical fiber of claim 21, wherein said adhesion promoter is selected from the group consisting of 3-acryloxypropyltrimethoxy-silane, 3-aminopropyltriethoxysilane, 3-methacryloxypropyltrimethoxy silane, 3-mercaptopropyltrimethoxysilane and 3-mercaptopropyltriethoxy silane, and mixtures thereof.

24. The coated optical fiber of claim 18, wherein said primary coating layer additionally comprises a photoinitiator.

25. The coated optical fiber of claim 18, wherein said primary coating layer additionally comprises from about 0.0001 to about 3.0 percent by weight of a stabilizer selected from the group consisting of organic phosphates; silanes; hindered phenols; amines and mixtures thereof.

26. The coated optical fiber of claim 1, wherein the primary coating comprises the radiation-cured reaction product of the following ingredients:
(A) from about 10 percent to about 90 percent by weight of a reactively terminated urethane oligomer which is the reaction product of (i) at least one polyol selected from the group consisting of poyether polyols, hydrocarbon polyols, polycarbonate polyols, and polyisocyanate polyols; (ii) a wholly aliphatic polyisocyanate; and (iii) an endcapping monomer supplying a reactive terminus;
(B) from about 5 percent to about 80 percent by weight of a monomer diluent which is terminated with at least one end group capable of reacting with the reactive terminus of (A);
(C) from about 0 percent to about 10 percent by weight of a photoinitiator; and
(D) from about 0 to about 3 percent by weight of an organofunctional silane adhesion promoter which binds in with the primary coating composition during cure; wherein all of the stated percentages are percentages by weight based on the total weight of (A), (B), (C) and (D), wherein the tensile modulus of the coating composition, when cured, is less about 500 psi at 25° C., and wherein the refractive index of the cured coating composition is at least 1.48.

27. The coated optical fiber of claim 1, wherein the primary coating comprising the radiation-cured reaction product of the following ingredients:
(1) from about 10 to about 80 percent by weight of one or more acrylate- or methacrylate-terminated aliphatic polyether urethane oligomers;
(2) from about 10 to about 75 percent by weight of one or more monomer diluents;
(3) from about 0 to about 10 percent by weight of a photoinitiator; and
(4) from about 0 to about 3 percent by weight of an organofunctional silane adhesion promoter which binds in with the primary coating composition during cure; all of said percentages being percentages by weight based on the weight of all said ingredients.

28. The coated optical fiber of claim 27, wherein the oligomer and the one or more monomer diluents are selected such that a mixture of the oligomer and the one or more monomer diluents is liquid at 5 to 25° C.

29. The coated optical fiber of claim 1, wherein the primary coating comprises a cured mixture of an aliphatic polyether urethane acrylate oligomer, a monomer selected from the group consisting of lauryl acrylate, or nonylphenol ethoxy acrylate, a photoinitiator selected from the group consisting of hydroxyclohexylphenyl ketone, an antioxidant selected from the group consisting of thiodiethylene bis(3, 5-di-tert-butyl-4-hydroxy hydrocinnamate), a chain transfer agent selected from the group consisting of isooctyl-3-mercaptopropionate, less than 5 weight percent, based or mixture weight, of a silane coupling agent selected from the group consisting of 3-mercaptopropyl trimethoxy silane, and a stabilizer selected from the group consisting of 3-aminopropyl trimethoxy silane.

30. An optical ribbon comprising a plurality of optical fibers of claim 1 and a matrix material, the plurality of fibers held together in a parallel arrangement by the matrix material.

31. A method of preparing a coated optical fiber for splicing, the coated optical fiber comprising a primary coating coated onto an optical fiber, comprising the steps of:

stripping the primary coating away from a portion of the optical fiber at a temperature in at least a portion of the temperature range from about 40° to about 200° C. by cutting with a blade into the primary coating, then having the blade exert a force on the primary coating in a direction parallel to the optical fiber to force the primary coating away from the portion of the optical fiber, and optionally wiping the portion of optical fiber from which primary coating has been forced away with an alcohol laden piece of cloth or paper, such that the stripped portion exhibits a ratio of little or no residue of the primary coating as observable under a 2 power magnification per 30 millimeter length of stripped portion.

32. A method of splicing coated optical fibers comprising, preparing two optical fibers for splicing according to the method of claim 31;

aligning the stripped portions of the prepared optical fibers; and joining the stripped portions of the prepared optical fibers.

33. A spliced optic fiber made by the method of claim 32.

34. A coated optical fiber comprising:

an optical fiber;

a primary coating coated onto the optical fiber, the primary coating made of a material which is removable from a glass substrate by a peel force of less than 50 grams of force, as measured by a 180° peel back test at 50% relative humidity and room temperature, an elongation to break of at least about 75% as measured by ASTM D-882, and a tensile strength of at least about 80 psi as measured by ASTM D-882.

35. A process for preparing a coated optical fiber comprising (1) applying to an optical fiber a primary coating composition layer comprising a mixture of the following ingredients:

(A) from about 10 percent to about 90 percent by weight of a reactively terminated urethane oligomer which is the reaction product of (i) at least one polyol selected from the group consisting of poyether polyols, hydrocarbon polyols, polycarbonate polyols, and polyisocyanate polyols; (ii) a wholly aliphatic polyisocyanate; and (iii) an endcapping monomer supplying a reactive terminus;

(B) from about 5 percent to about 80 percent by weight of a monomer diluent which is terminated with at least one end group capable of reacting with the reactive terminus of (A);

(C) from about 0 percent to about 10 percent by weight of a photoinitiator; and (D) from about 0 to about 3 percent by weight of an organofunctional silane adhesion promoter which binds in with the primary coating composition during cure;

wherein all of the stated percentages are percentages by weight based on the total weight of (A), (B), (C) and (D), wherein the tensile modulus of the coating composition, when cured, is less about 500 psi at 25° C., and wherein the refractive index of the cured coating composition is at least 1.48; and (2) radiation-curing said coating in situ, wherein the primary coating is strippable from a portion of the optical fiber at a temperature in at least a portion of the temperature range from about 40° to about 200° C. by exerting a force to a portion of the primary coating about the portion of optical fiber in a direction parallel to the longitudinal axis of the glass fiber which is away from a portion of the primary coating remaining on the optical fiber, such that the exertion of force followed by an optional one wipe, with an alcohol laded piece of cloth or paper of the stripped portion of optical fiber, results in the stripped portion of optical fiber having a ratio of substantially no residue of the primary coating as observable by a 2 power magnification per 30 millimeter length of the stripped portion.

36. The process of claim 35, wherein said mixture comprises:

(i) from about 10 to about 80 percent by weight of one or more acrylate- or methacrylate-terminated urethane oligomers;

(ii) from about 10 to about 75 percent by weight of one or more monomer diluents;

(iii) from about 0 to about 10 percent by weight of the photoinitiator; and (iv) from about 0 to about 3 percent by weight of the organofunctional silane adhesion promoter which binds in with the primary coating composition during cure, all of said percentages being percentages by weight based on the weight of all said ingredients.

37. The fiber of claim 8, wherein the elongation to break for the primary coating is about 80%.

38. The fiber of claim 34, wherein the elongation to break for the primary coating is about 80%.

* * * * *